United States Patent [19]
Gates et al.

[11] Patent Number: 6,085,278
[45] Date of Patent: Jul. 4, 2000

[54] COMMUNICATIONS INTERFACE ADAPTER FOR A COMPUTER SYSTEM INCLUDING POSTING OF SYSTEM INTERRUPT STATUS

[75] Inventors: Stillman F. Gates; Jamileh Davoudi, both of Los Gatos, Calif.

[73] Assignee: Adaptec, Inc., Milpitas, Calif.

[21] Appl. No.: 09/089,068

[22] Filed: Jun. 2, 1998

[51] Int. Cl.[7] .............................. G06F 9/48; G06F 13/14; G06F 13/24
[52] U.S. Cl. ............................ 710/263; 710/266; 710/22
[58] Field of Search .................................. 710/36, 22, 48, 710/47, 100, 130, 129, 260, 263, 52, 62, 266; 712/244; 714/2, 25, 47; 711/156; 370/242; 709/301, 107

[56] References Cited

U.S. PATENT DOCUMENTS

| | | | |
|---|---|---|---|
| 4,326,247 | 4/1982 | Chamberlin | 712/42 |
| 5,131,081 | 7/1992 | MacKenna et al. | 710/22 |
| 5,666,559 | 9/1997 | Wisor et al. | 710/32 |
| 5,689,726 | 11/1997 | Lin | 710/10 |
| 5,819,112 | 10/1998 | Kusters | 710/36 |

*Primary Examiner*—Gopal C. Ray
*Attorney, Agent, or Firm*—Skjerven, Morrill, MacPherson, Franklin & Friel LLP; Ken J. Koestner

[57] ABSTRACT

To facilitate access of interrupt status information, interrupt posting status. POST_STAT registers are readable by a host driver routine to quickly supply information relating to a functional block which has given rise to an interrupt status condition. The interrupt posting status POST_STAT registers contain a summary of interrupt status information. The host driver may then read the interrupt posting status POST_STAT register corresponding to the functional block to further investigate the cause of the interrupt status. System memory includes a mirror storage of the interrupt posting status POST_STAT registers that is transferred to the mirror storage by a direct memory access (DMA) operation. Values in the system mirror storage are updated automatically when a change occurs in a value within the interrupt posting status POST_STAT registers. A host system software driver accesses the interrupt posting status POST_STAT registers via a bus access operation, changes a bit in a POST_STAT register, and monitors the result of the access and bit change in the mirror of the POST_STAT register in the system memory without a further bus read access. Advantageously, multiple accesses through the bus to verify when the written value status is correct is eliminated.

49 Claims, 10 Drawing Sheets

6,085,278

COMMUNICATIONS INTERFACE ADAPTER FOR A COMPUTER SYSTEM INCLUDING POSTING OF SYSTEM INTERRUPT STATUS

BACKGROUND OF THE INVENTION

1. Field of the Invention

The present invention relates to network interface devices. More specifically, the present invention relates to interrupt control and monitoring systems in a host adapter of a network interface.

2. Description of the Related Art

Personal computers (PC's) such as microcomputers have gained widespread use in recent years primarily because they are inexpensive and yet powerful enough to handle computationally-intensive user applications. Data storage and data sharing functions of personal computers are often expanded by coupling a group of such computers to peripheral devices such as disk drives, tape drives, and printers. The peripheral devices and the personal computers are interconnected through a single communications network, such as a local area network.

The group of computers is coupled using interfaces that facilitate and accelerate communications among the computers and peripheral devices. A host adapter is a common interface device that is used to connect a first bus that has a specified protocol for transferring information over the first bus and a first data transfer speed to a second bus. The second bus also has a specified protocol for transferring information over the second bus at a second data transfer speed. The host adapter operates to transfer information between the first bus and the second bus.

The host adapter performs numerous functions to facilitate communications among devices. One function that may be supported by the host adapter is interrupt control and monitoring. Host adapter hardware and software communicate by issuing interrupts indicating command completion, error reporting, and driver intervention.

Although interfaces are have high-speed capabilities for transferring information, access to control and status information is hindered when the control and status information to be accessed is on an opposite side of a bus from the accessing device or controlling software driver. What is needed is an efficient way of posting interrupts to utilize a host driver, reduce bus read accesses, and reduce interference with normal operations of the host adapter.

SUMMARY OF THE INVENTION

To facilitate access of interrupt status information, interrupt posting status POST_STAT registers are readable by a host driver routine to quickly supply information relating to a functional block which has given rise to an interrupt status condition. The interrupt posting status POST_STAT registers contain a summary of interrupt status information. The host driver may then read the interrupt posting status POST_STAT register corresponding to the functional block to further investigate the cause of the interrupt status.

System memory includes a mirror storage of the interrupt posting status POST_STAT registers that is transferred to the mirror storage by a direct memory access (DMA) operation. Values in the system mirror storage are updated automatically when a change occurs in a value within the interrupt posting status POST_STAT registers.

A host system software driver accesses the interrupt posting status POST_STAT registers via a bus access operation, changes a bit in a POST_STAT register, and monitors the result of the access and bit change in the mirror of the POST_STAT register in the system memory without a further bus read access. Advantageously, multiple accesses through the bus to verify when the written value status is correct is eliminated.

An automatic interrupt posting status update functionality, when enabled, preposts an interrupt condition in the system memory mirror storage of the interrupt posting status POST_STAT registers before the bus interrupt signal is activated. When the automatic interrupt posting status update functionality is not enabled, a bus interrupt signal is activated without delay.

The interrupt posting status POST_STAT registers are included in a command management channel (CMC) and data is transmitted from the command management channel over the bus using a CIP DMA direct memory access operation. The CIP DMA operation includes a read and compare option that ensures that correct interrupt status information is posted into the system memory mirror storage from the POST_STAT registers and checks for any update during the DMA operation. The CIP DMA handling circuit contains a system memory address register. When the CIP DMA system memory address register is loaded with a target memory address and the DMA operation is enabled, the CIP DMA function operates independently of the local and system processors.

The command management channel supports dual interrupt requests, one interrupt request for normal interrupts and a second interrupt request for abnormal interrupts. The two interrupt requests are programmable and are selectively merged into one interrupt.

Interrupts are selectively controlled so that one interrupt is generated per command completion, or multiple command completions are queued on a single interrupt.

The host adapter supports a system memory mirror functionality of the HCNTRL[1:0] and POST_STAT[3:0] register values. System mirrored values are automatically and dynamically updated in the system memory when corresponding values change in the host adapter. The system memory mirror functionality allows a software driver to perform a PCI bus access to the HCNTRL[1:0] and POST_STAT[3:0] registers, change a bit, and then monitor the result in system memory without performing additional PCI bus read accesses. The system memory mirror functionality eliminates the multiple read accesses through the PCI bus that would otherwise be used to verify when a written value status is correct.

The interrupt condition is preposted in the system memory mirror of POST_STAT[3:0] before a PCI interrupt signal is activated when automatic updating is enabled. When automatic updating is not enabled, a PCI interrupt signal is activated without delay and host driver must access the POST_STAT[3:0] register directly to determine the cause of the interrupt.

The command management channel supports a 64-bit DMA transfer functionality between a CMC data buffer and the PCI bus. The command management channel further supports a 16-bit or 8-bit DMA transfer capability between the CMC data buffer and the memory port interface. The command management channel also supports 16-bit or 8-bit DMA transfer functionality between CMC buffer and CIO-BUS devices, including Multi-Tasking Protocol Engine microcode storage, using the CIOBUS.

BRIEF DESCRIPTION OF THE DRAWINGS

The features of the described embodiments believed to be novel are specifically set forth in the appended claims.

However, embodiments of the invention relating to both structure and method of operation, may best be understood by referring to the following description and accompanying drawings.

The use of the same reference symbols in different drawings indicates similar or identical items.

DESCRIPTION OF THE PREFERRED EMBODIMENT(S)

Figure 1:
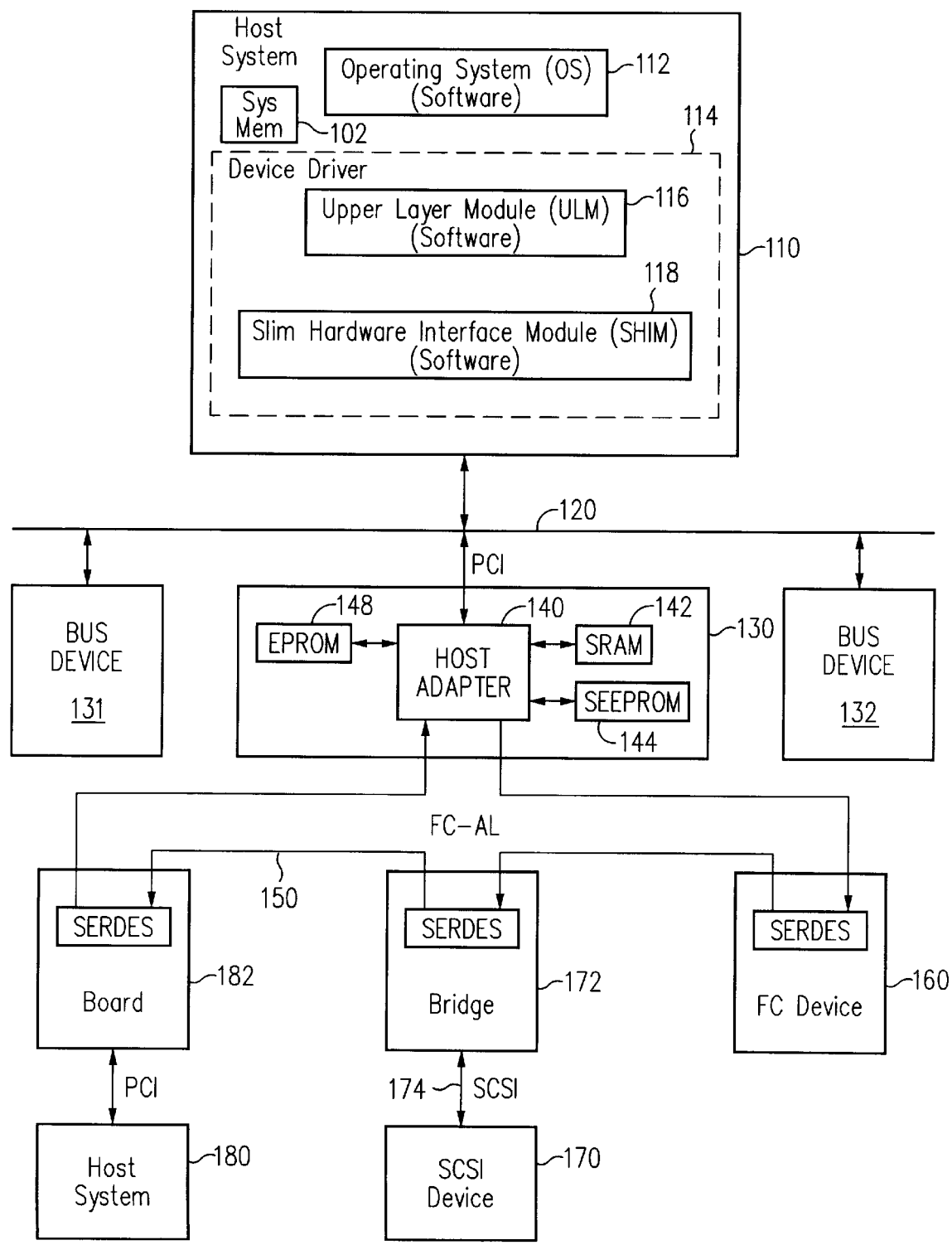
FIG. 1 is a block diagram showing a computer system including a system bus device and a host adapter in accordance with an embodiment of the invention.

A host adapter 140 is depicted FIG. 1, a schematic block diagram showing a computing system 100. The host adapter 140 functions as a high-speed data transfer interface between a Peripheral Component Interconnect (PCI) system and a serial Fibre Channel (FC) link 160 through usage of a media interface serializer/deserializer (SERDES) circuit. In an illustrative system, the host adapter 140 transfers data at a transfer rate on the order of a hundred megabits per second.

A software manager for the host adapter 140 has two parts including an upper layer module (ULM) 116 and a hardware interface module 118. The upper layer module 116 isolates the hardware interface module 118 from an operating system 112. The hardware interface module 118 isolates the upper layer module 116 from hardware in the host adapter 140. Hardware and software of the host adapter 140 communicate by issuing interrupts on the occurrence of various events including command completion, error reporting, and driver intervention events.

Figure 2:
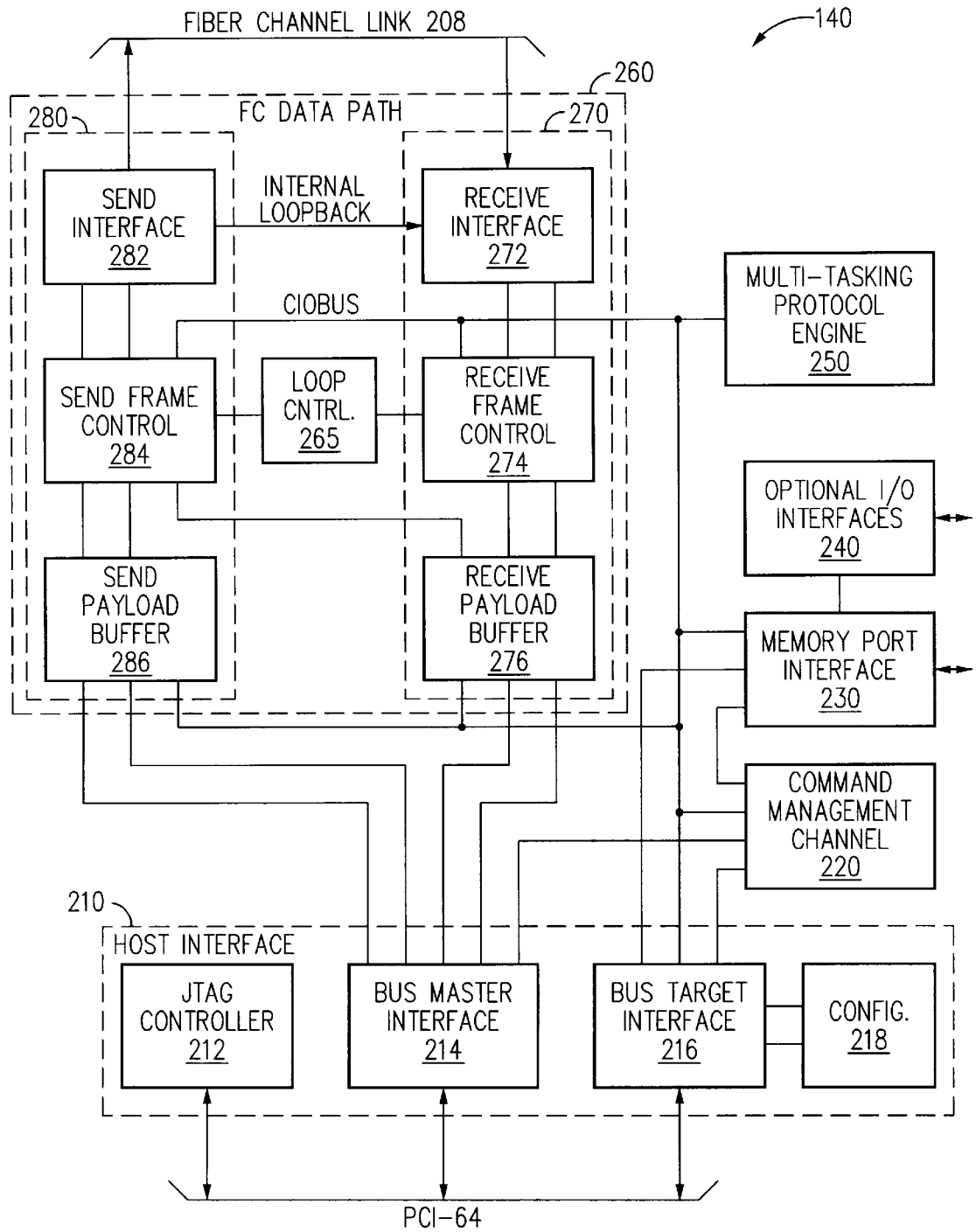
FIG. 2 is a block diagram that illustrates the host adapter shown in FIG. 1.
Figure 3:
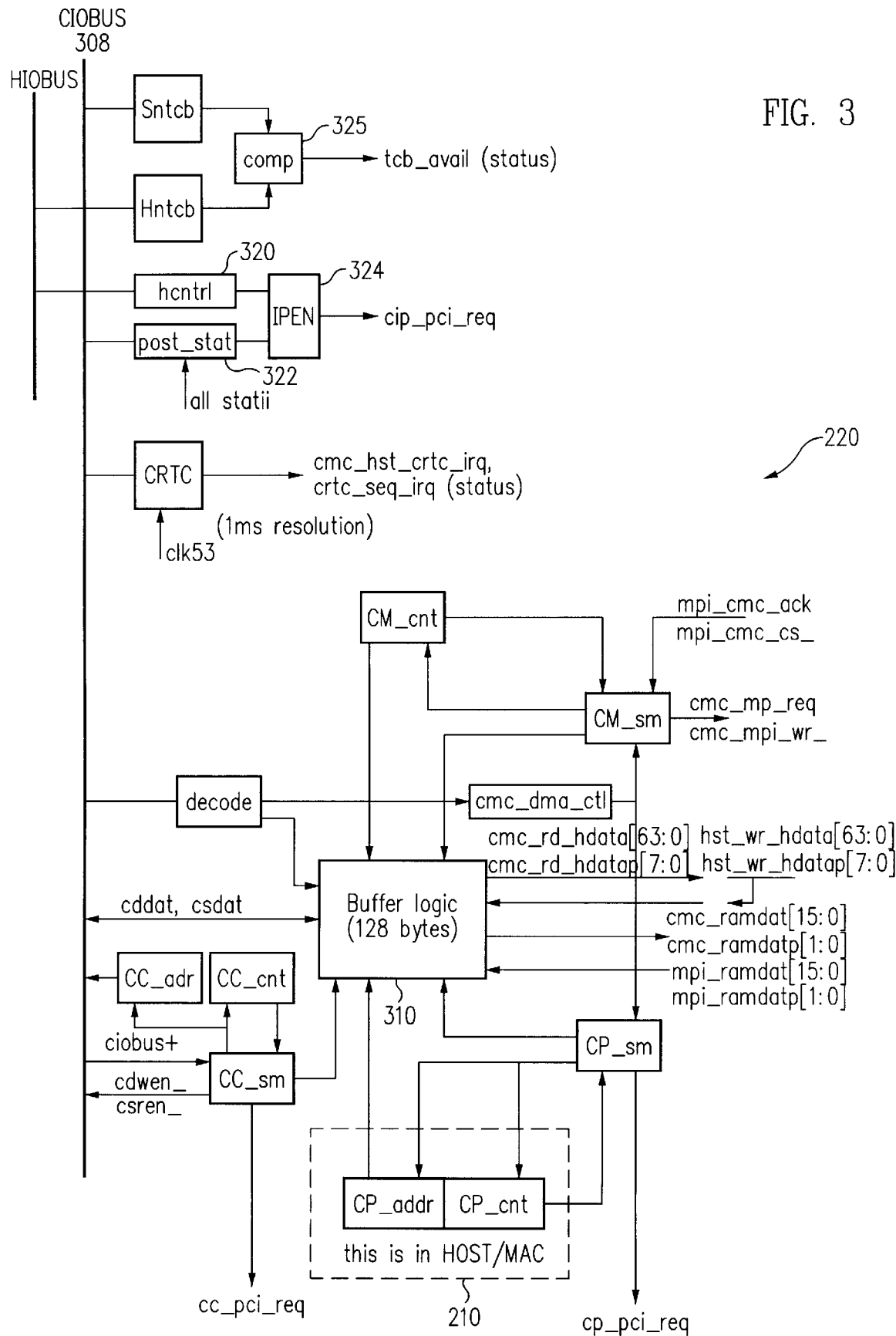
FIG. 3 is a schematic block diagram that illustrates the internal architecture of a command management channel.

The host adapter 140 implements a command management channel 220 shown in FIG. 2 that improves interrupt performance by consolidating posting of interrupt status in a single group of registers, in particular interrupt posting status registers 322 shown in FIG. 3, and accessing the interrupt posting status registers 322 using a direct memory access (DMA) operation. The interrupt posting operations of the host adapter 140 advantageously exploit operations of host driver software, reduce the number of PCI bus 120 read accesses and reduce interference with normal data transfer operations of the host adapter 140. By posting interrupts in the single set of interrupt posting status registers 322, interrupt status information is consolidated rather than scattered among various addressed storage cells, so that the host driver software accesses all interrupt status information in a reduced or minimized number of read operations. The command management channel 220 thus supplies a summary of maskable interrupt status information in the interrupt posting status registers 322 for interrupt status information that results from operational conditions in multiple various blocks.

Figure 10:
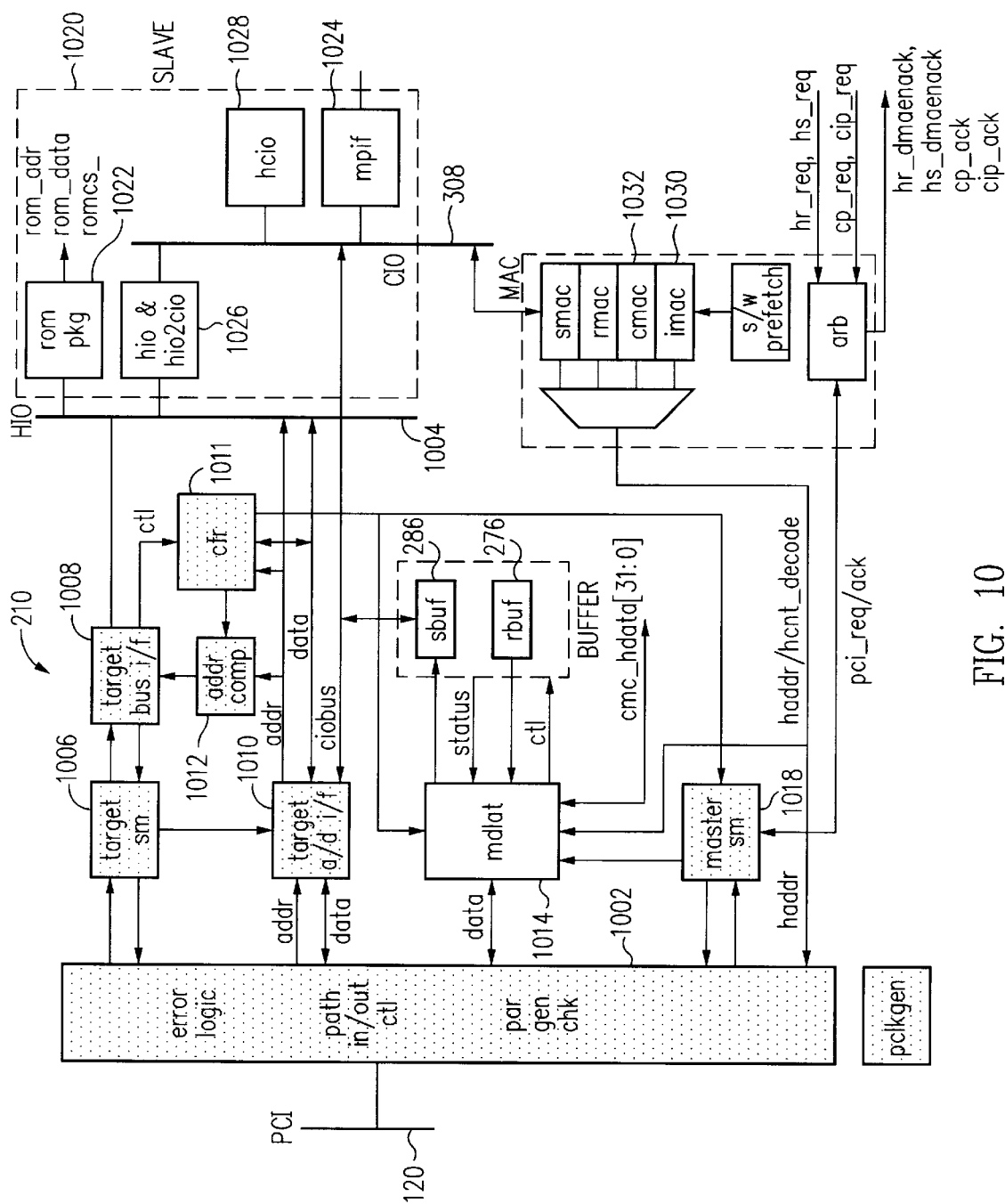
FIG. 10 is a schematic block diagram that illustrates part of the internal architecture of a host interface.

Direct memory access (DMA) communications between the command management channel 220 and the PCI bus 120 via a CIP DMA operation quickly send the byte of status information stored in the interrupt posting status registers 322 to a preselected location 1030 in host memory (see FIG. 10). The CIP DMA operation greatly accelerates access to interrupt status information in comparison to a typical technique of a software driver transferring interrupt status information via slow programmed input output (PIO) operations.

Access to posted interrupt information is further accelerated by the command management channel 220 through an automatic update option. The automatic update option is activated by setting a bit CIP_DMAEN in CMC_DMA_CTL, a DMA control register in the command management channel 220. With the CIP_DMAEN signal asserted, when any status bit changes from zero to one in the interrupt posting status registers 322, a request for a CIP DMA operation is sent to the PCI bus 120.

A copy of the interrupt status, as transferred from the interrupt posting status registers 322, is stored in host memory and held available for access by the host driver so that the interrupt status information is always current and available without requesting a PIO read of locations in the host adapter 140.

When automatic updating is enabled (CIP_DMAEN asserted), a PCI interrupt signal is activated following the posting of interrupt conditions in the system memory. When automatic updating is not enabled, the PCI interrupt signal is activated without delay and the host driver is to access the interrupt posting status registers 322 directly to determine the cause of the interrupt.

The command management channel 220 includes interrupt posting enable IPEN[3:0] registers to individually control issue of interrupts for each status bit, thereby enhancing flexibility of interrupt control via operations of the ULM 116, and the hardware interface module 118. Individual control of interrupt posting is attained by enabling or disabling individual bits in the interrupt posting enable IPEN [3:0] registers.

The CIP DMA operation is supported by a read back and compare function through operations of a Device Configuration (DEVCONFIG) in configuration registers 218 shown in FIG. 2. The DEVCONFIG register includes a CIP_RD_DIS bit which, when set, disables a read and compare operation of the posted interrupt status. When CIP_RD_DIS is not set, a CIP DMA operation that writes to a selected system memory location is automatically and immediately followed by a CIP DMA read and compare operation. The read and compare operation ensures that the status has correctly been posted into system memory. If a mismatch occurs in the status compare operation, the CIP DMA operation is repeated since another status update may have been received.

The CIP DMA read and compare operation is particularly useful for systems in which the PCI interface includes a bridge that may delay delivery of the initial write status DMA data to system memory in the computing system 100. The DIP DMA read forces a bridge to forward the write data and returns the written data from the system memory for the compare operation. A miscompare status generated by the compare operation indicates the occurrence of a data error during the write or read DMA operation, or that a new interrupt condition has occurred.

The command management channel 220 generates two interrupts including IRQ0 and IRQ1. The command management channel 220 generates an interrupt IRQ 1 upon the event of an error status condition including a PCI error, a software error, and a hardware error. The command management channel 220 generates an interrupt IRQ0 in response to normal command completions or an event-related interrupt such as expiration of an internal timer or receipt of an LIP. The host adapter 140 includes an EXTINT pin that is routed to the command management channel 220 via the memory port interface 230 to supply an external interrupt functionality. The interrupt posting status registers 322 include an EXTINT bit that responds to signals applied to the EXTINT pin. EXTINT is used in a variety of applications depending on a particular subsystem connected to the host adapter 140. For example, EXTINT may be connected to a source of a high temperature indicator signal to set an interrupt posting bit that flags a fan failure.

One interrupt is generated per command completion. In addition, the command management channel 220 includes host new TCB queue offset registers HNTCB_QOFF1:0 for posting of multiple commands simultaneously by the hardware interface module 118, and sequencer new TCB queue offset registers SNTCB_QOFF1:0. When SNTCB_QOFF1:0 and HNTCB_QOFF1:0 do not contain the same value, a status bit 325 is active. The Multi-Tasking Protocol Engine 250 reads the sequencer new TCB queue offset registers SNTCB_QOFF1:0 which contain the next new command ID. Each read operation causes SNTCB_QOFF1:0 to increment. Multi-Tasking Protocol Engine 250 continues reading until the queue is empty, indicated when status bit 325 is inactive. Thus, the device driver 114 services commands that have been completed without error, without interrupting the multi-tasking protocol engine 250. Commands that are completed by the Multi-Tasking Protocol Engine 250 are returned to a Done queue in the system via CP DMA of the host interface 210. Following completion of the DMA operation, an interrupt is generated to the device driver 114.

FIG. 1 shows a computing system 100 in accordance with an embodiment of the invention. Computing system 100 includes a host computer 110, which has a system bus 120, and system bus devices 130 to 132 that are connected to system bus 120. Device 130 is a Fibre Channel controller integrated circuit (IC) component that includes a host adapter 140 for control of a peripheral bus 150 connected to a media interface serializer/deserializer (SERDES) chipset to perform selectable parallel 20-bit or parallel 10-bit high speed data transfers between a parallel system Peripheral Component Interconnect (PCI) bus 120 and a serial Fibre Channel (FC) link 160. The SERDES chipset performs parallel to serial send data conversion with internal high speed serial transmit clock generation, receive serial to parallel data conversion, receive word sync detection, receive data clock extraction, and serial data loopback functions. Host computer 110 can communicate via device 130, with devices 160, 170, and 180 that are connected to bus 150 and supports link module identification, attached media identification, and optical fiber safety sense and control. In particular, host computer 110 executes software including an operating system 112 and a device driver 114 for devices 160, 170, and 180. Device driver 130 includes a hardware interface module (HIM) 118 that communicates with device 130 via bus 120 and at least one upper layer module (ULM) 116 that communicates with devices 160, 170, and 180 via HIM 118 and device 130.

In an exemplary embodiment of the invention, host computer 110 is a personal computer, system bus 120 is an industry standard Peripheral Component Interconnect (PCI) bus, and bus 150 is a fiber channel (FC) bus. Device 130 is a PCI board in host computer 110. As an example, application of host adapter 140, devices 160, 170, and 180, which connect to bus 150, are respectively a fiber channel device, a SCSI device such as a hard drive which connects to bus 150 via a bridge circuit 172 including a serializer/deserializer, and another computer system 180 having a board 182 for connection and communications via fiber channel bus 150.

Host adapter 140 is a programmable integrated circuit that includes a multi-tasking protocol engine. The multi-tasking protocol engine executes software or firmware for controlling communications between host computer 110 and devices on bus 150. Coupled to host adapter 140 is a local memory including volatile memory 142 and non-volatile memory 144 and 148. Volatile memory 142, typically DRAM or SRAM and preferably a synchronous SRAM, is for information such as transfer control blocks for SCSI device 170. The non-volatile memory including a conventional EPROM, EEPROM or Flash memory 148, and an SEEPROM 144 for critical configuration information and non-critical information. In the exemplary embodiment, SEEPROM is a 1-Kbit memory that stores a world-wide port and node name, a local address, a subsystem-ID, a subsystem vendor ID, a preferred FC port address, external ROM/EEPROM size information, and other board related data. The world wide address is a world-wide unique address assigned to each port in the network and is represented as a 64-bit unsigned binary value. In addition, a 64-bit world wide node address is assigned to each node in a port. Also stored in SEEPROM 144 are the subsystem vendor ID and the subsystem board ID, represented as 16-bit binary values. An 8-bit preferred FC port address, which the address for device in an arbitrated loop, may also be stored in SEEPROM 144. Co-filed U.S. patent application Ser. No. 09/089,044, entitled "Multiple Access Memory Architecture" further describes the use and organization of the local memory space (e.g., memories 142, 144, and 146) of a host adapter and is hereby incorporated by reference in its entirety.

FIG. 2 is a block diagram of the exemplary embodiment of host adapter 140. In the exemplary embodiment, host adapter 140 includes a host interface 210, a command management channel 220, a memory port interface 230, a multi-tasking protocol engine 250, and a fiber channel data path 260. Host interface 210 connects to system bus 120 and implements the PCI bus protocols which permits adapter 140 to act as either the bus master or target. As illustrated in FIG. 2, host interface 210 includes JTAG circuitry 212 for JTAG circuit testing, a bus master interface 214 that implements PCI bus master protocols, and a bus target interface 216 that implements the protocols for a target on PCI bus 120. Configuration registers 218 contain configuration data for PCI interface 210 including a device base address and an interrupt request (IRQ).

JTAG circuitry 212 includes a JTAG compatible test port for I/O boundary scans such as multiple core scan loops. The JTAG circuitry 212 further includes an I/O pad internal pull-up, pull-down disable for $I_{ddq}$ testing, an input pad NAND ring test mode, and independent output tri-state control.

In alternative embodiments of the invention, host interface 210 can employ any alternative host interface architecture including any of the PCI interface circuits that are known in the art. In one embodiment, the PCI interface 210 functions as a full featured PCI 64/32-bit bus master with zero wait state transfer capability and performs PCI cacheline data transfer commands including streaming transfers to enhance host system memory access.

Transfer command blocks (TCBs) are transferred to and from the PCI system memory via the command management channel 220. The TCBs are issued from the host to specify the details of the data transfer, such as direction, length, and address of the data in the target. The command management channel 220 includes a hardware control register called the CMC Host Control register. The CMC Host Control register operates in conjunction with two registers in the host interface 210, a Host Command 0 register and a Host Command 1 register, to support device driver control of hardware features in the host adapter 140.

FC data path 260 contains two sets of flexible flow-through style data buffers forming pathways for information sent or received via a fiber channel link 208 (i.e., peripheral bus 150). As shown in FIG. 2, FC data path 260 includes a receive data path 270 for information received from the fiber channel link in FC receive link to PCI local bus 120 data transfers, a send data path 280 for information to be sent on the fiber channel link in PCI local bus 120 to FC send link data transfers, and a loop back control circuit 265 for supporting link diagnostics such as internal loopback control. The loop back control circuit 265 further supports arbitrated loop operations including private loops, public loops, private and public loop auto-detection, and alias addresses. Co-filed U.S. patent application Ser. Nos. 09/089, 311 and 09/089,274 further describe the operation of an exemplary embodiment of FC data path 260 and components therein and are hereby incorporated by reference herein in their entirety.

The send payload buffer 286 in the send data path 280 and the receive payload buffer 276 in the receive data path 270 each accepts up to a configured frame payload size of 2048, 1024, 512, 256, or 128 bytes and allows a current or future frame payload to be filling while previous frame payloads are emptying. Send payload buffer 286 are configured to match the receive payload buffer 276 login size at the receive port of the frame. Receive payload buffers 276 are configured the host adapter 140 login size and accept payloads less than the configured size.

Each of the send payload buffer 286 and the receive payload buffer 276 data buffer set has a payload manager that contains a Scatter/Gather (S/G) capable Direct Memory Access (DMA) channel for transferring buffer data to/from the PCI local bus 120. The DMA channel contains an S/G element First-In-First-Out (FIFO) buffer (not shown) that allows future S/G list elements to be stored while the current element is being processed by the DMA channel. S/G elements are prefetched from an S/G list in a synchronous Static Random Access Memory (SRAM) connected to the Memory Port Interface (MPI) 230 block and stored in the FIFO by the Multi-Tasking Protocol Engine 250. S/G prefetching minimizes the transfer delay to/from the PCI local bus 120 when completing one element and starting the next, as the transfer proceeds without delay. The two DMA channels enable different commands to be processed concurrently with data transferred in both directions.

Multi-tasking protocol engine 250 executes protocol commands described by a Transfer Control Block (TCB) and scatter/gather (S/G) lists to control the data transfer between the host system memory and the Fibre Channel connected device. A TCB is a data structure that contains all information for the execution of a command. TCBs are prepared by the device driver in a host system memory TCB array along with the associated S/G elements. In the illustrative computing system 100, the Fibre Channel (FC) device 160 executes high-speed Fibre Channel protocol transfers with the Multi-Tasking Protocol Engine 250 performing initialization and monitoring functions. The Multi-Tasking Protocol Engine 250 handles Fibre Channel protocol transfers by executing operations based on a clock rate referenced to a Fibre Channel clock (not shown). Host computer 110 can store such information in the local memory of host adapter 140 for access by multi-tasking protocol engine 250. Multi-tasking protocol engine 250 connects via an internal bus CIOBUS to memory port interface 230 which provides access to the local memory. Bus CIOBUS connects to multi-tasking protocol engine 250, memory port interface 230, FC data path 260, command management channel 220, and host interface 210. To access local memory, multi-tasking protocol engine 250 first acquires control of bus CIOBUS from a bus arbitrator (not shown). Multi-tasking protocol engine 250 can then read from local memory via memory port interface 230, from a buffer memory in command management channel 220, or from host interface 210. Host interface 210 or command management channel 220 can similarly acquire control of internal bus CIOBUS and access memory via memory port interface 230.

The Multi-Tasking Protocol Engine 250 uses the command management channel 220 DMA channel to transfer TCBs from the TCB array in the host system memory to a TCB synchronous SRAM array connected to the memory port interface 230. The Multi-Tasking Protocol Engine 250 transfers the contents of a TCB to the appropriate registers for execution. The TCBs are executed independently of the Fibre Channel Target ID in the order received. The Multi-Tasking Protocol Engine 250 handles all normal protocol command activity with or without a host system interrupt upon command completion.

The memory port interface 230 is used to access devices that are external to the host adapter 140. Memory port interface 230 provides an interface to local memory including volatile memory 142 and non-volatile memory 144 and 146.

Memory port interface 230 also controls other I/O interfaces 240. I/O interfaces 240 implement a variety of functions including a general purpose interface, an external request interface, an activity indicator interface, a monitor interface, and a test interface. The general purpose interface permits includes sets of generic, addressable pins for input and output signals. The external request interface provides for an external pause request and acknowledge for Peek/ Poke operations, a firmware load request and acknowledge, and an external interrupt of host adapter 140. The activity indicator interface is an LED indicator output port for indicating the activity of host adapter 140. The monitor interface allows selection of internal signal from within host adapter 140 for external monitoring. The monitor port interface is generally used during debugging of host adapter 140 during initial design and testing. Co-filed U.S. patent application Ser. No. 09/089,278 describes a monitor port with selectable trace support which is employed in the exemplary embodiment of the invention and is hereby incorporated by reference in its entirety. The test interface provides for initiation and output of results of self tests performed within host adapter 140. Interfaces 240, while useful, are not required and can be omitted. Additionally, other types of interface can be added according to the functions of the adapter 140.

Referring to FIG. 3, a schematic block diagram shows the internal architecture of the command management channel 220. The command management channel (CMC) block 220 includes a buffer logic block 310 that contains 128 bytes of SRAM for temporary storage of new and done transfer control blocks (TCBs) and scatter/gather (S/G) list elements. The CMC data buffer includes 128 bytes of parity-protected SRAM that are byte/word accessible by the Multi-Tasking Protocol Engine 250 and accessed in 1, 2, or 4 byte groups from the PCI bus 120. The TCBs and S/G list elements are transferred to and from the command management channel 220 using direct memory access (DMA) operations. The command management channel 220 supports 64-bit DMA transfers between the CMC SRAM and the system (PCI) bus 120, and supports 16-bit or 8-bit DMA transfers between the CMC SRAM and the memory port interface 230 or devices connected to the command management channel 220 by the CIOBUS 308. The command management channel 220 supports interrupt handling for utilization by a host driver with selectable activation sources for activation. The command management channel 220 includes hardware control registers (HCNTRL[1:0] and CMC_HCTL) 320 and interrupt posting status registers (POST_STAT[3:0]) 322 to support software driver control of the host adapter 140. POST_STAT registers contain a maskable interrupt status caused by Fiber Channel, PCI bus interface 320, and memory port interface 230 operational conditions. The command management channel 220 interfaces to most major blocks in the host adapter 140 as shown in FIG. 1.

The host adapter 140 supports a system memory mirror functionality of the HCNTRL[1:0] 320 and POST_STAT [3:0] 322 register values. System mirrored values are automatically and dynamically updated in the system memory when corresponding values change in the host adapter 140. The system memory mirror functionality allows a software driver to perform a PCI bus access to the HCNTRL[1:0] 320 and POST_STAT[3:0] 322 registers, change a bit, and then monitor the result in system memory without performing additional PCI bus read accesses. The system memory mirror functionality eliminates the multiple read accesses through the PCI bus that would otherwise be used to verify when a written value status is correct.

The interrupt condition is preposted in the system memory mirror of POST_STAT[3:0] 322 before a PCI interrupt signal is activated when automatic updating is enabled. When automatic updating is not enabled, a PCI interrupt signal is activated without delay and host driver must access the POST_STAT[3:0] register 322 directly to determine the cause of the interrupt. Several signals are communicated between the command management channel 220 and the host computer 110. Host CMC Write Data (hst_cmc_wr_hdataf[63:0]) is a 64-bit command channel DMA data path from host computer 110 to command management channel 220. CMC Host Data parity (hst_cmd_wr_hdatap[7:0]) signals carry 1-bit parity for each 8-bit data. The host computer 110 generates the byte parity when writing to the CMC buffer. CMC Read Host Data (cmc_rd_hdata[63:0]) is a 64-bit command channel DMA data path from command management channel 220 to host computer 110. CMC Host Data parity (cmc_rd_hdatap [7:0]) signals carry 1-bit parity for each 8-bit data. In the read direction, the byte parity stored in the CMC buffer is driven out. The source of the parity generation in the read direction can be from the memory port interface 230 or self-generated in command management channel 220 if the multi-tasking protocol engine 250 initializes the CMC buffer data.

The command management channel 220 generates a CMC BUFFER RAM <> PCI request (cmc_cp_pci_req) signal for indicating that the command management channel 220 initiates a PCIDMA transfer for transactions between PCI bus interface 320 and CMC Buffer. The cmc_cp_pci_req signal is active when CP_DMAEN is active and is to be connected to the internal PCI arbiter. The PCI DMA operation may be continued with an internal DMA operation between CMC Buffer and external memory.

A CMC BUFFER RAM <> PCI Acknowledge (hst_cp_pci_ack) is a signal that, when active (1), indicates that the internal arbiter has given priority to the CMC BUFFER RAM <> PCI request and has won PCI bus arbitration.

A CMC Interrupt Status <> PCI request (cmc_cip_pci_req) signal indicates that the command management channel 220 initiates a PCIDMA transfer from POST_STATUS registers to host interface 210. The cmc_cip_pci_req signal is active when CIP_DMAEN is active and is to be connected to the internal PCI arbiter.

A CMC Interrupt Status <> PCI Acknowledge (hst_cip_pci_ack) signal of host interface 210, when active (1), indicates that the internal arbiter has given priority to the CMC Internal Status <> PCI request and has won PCI bus arbitration.

A CMC BUFFER RAM <> CIOBUS device request (cmc_cc_pci_req) signal indicates that the command management channel 220 initiates a PCI DMA transfer for transactions between PCI bus interface 320 and CMC Buffer RAM for a CIOBUUS device or a multi-tasking protocol engine 250 microcode download DMA operation. The cmc_cc_pc_req signal is active when CP_DMAEN and CC_DMAEN are both active and is to be connected to the internal PCI arbiter.

A CMC BUFFER RAM <> CIOBUS device Acknowledge (hst_cc_pci_ack) signal, when active (1), indicates that the internal arbiter has given priority to the CMC BUFFER RAM <> CIOBUS pci_request and has won PCI bus arbitration CMC Host Interrupt request (cmc_hst_irq0:1) signals generate the PCI IRQA[0]# and PCI IRQA[1]# interrupts and are active until cleared by a CLRINT register in which all the interrupt signals causing irq0 or irq1 are cleared. The cmc_hst_irq1 signal generates PCI IRQA[1]# unless both IRQA[1:0]# are merged into IRQA[0]#.

An active-high Host Pause Acknowledge (cmc_hpack) signal is communicated to the host interface 210 to indicate host interface 210 ownership of the CIOBUS 308.

A Host IO bus (hiobus[ ]) contains various bus signals of an internal peripheral bus. The bus signals include a Host IO address bus (hst_hio-addr[3 1:0]), a Host IO data bus (hst_hio_data[31:0]), a HIOBUS read strobe (hst_hio_rd_1) indicating a read cycle in progress when active (0), and a HIOBUS write strobe (hst_hio_wr_1) indicating a write cycle in progress when active (0). The hiobus[ ] signals further include active-low HIOBUS byte enables (hst_hio_be[3:0]_1) indicating data transfer on byte lanes 3:0 respectively, a Host IO stretch (hio_stretch) output signal indicating that the HOST slave access is to be lengthened until hio_stretch is removed when active (1), and a Host IO device space address decode (hst_hio_dsdec) signal. The hiobus[] also includes a Host Power on Reset (hst_por_1) signal indicating power on reset from the host interface 210, a Host PCI Power on Reset (hst_pci_por_1) signal indicating power on reset synchronized with pclk, and a Host Master Enable (hst_masteren) signal, the register bit from the configuration registers 218 COMMAND register and derived from pclk.

Other HIOBUS signals include a Host Data_Path RPB-HST Parity Error (hst_drhparerr) signal indicating an odd parity error (when active) detected in the device internal data path from receive payload buffer 276 to host interface 210. A Host CMC Buffer Parity Error (hst_crparerr) signal indicates odd parity error (when active) detected during data transfer from CMC buffer logic block 310 to host interface 210. Host Data Parity Check Enable (hst_dparcken) signal enables data parity checking for data paths and is taken directly from the register bit DPARCKEN and derived from pclk. All data paths parity checking such as RPB>HST, SPB>SFC, HST <> CMC, and CMC <> MPI are only enabled when hst_dparcken is active (1).

Host CP_DMA Count0 Write Enable (hst_cp_dma_cnt0_wren) signal writes to CM_DMA_CNT0 register when a count value is written to CP_DMA_CNT0 register residing in host interface 210. Otherwise, both registers have the same value.

Host CIP Read Disable (hst_cip_rd_dis) signal is bit 2 of CMC_DMA_CTL register and indicates, when set (1), that only an 4-byte PCI write takes place and no PCI read follows. The default value for hst_cip_rd_dis is 0 so that posting of a 4-byte status using a PCI write is followed by a PCI read.

The host interface 210 generates a hst_cp_pci_done control signal that, when active (1), indicates that a DMA operation between CMC SRAM and the host computer 110 is completed. The hst_cp pci_done signal is cleared by the interface signal cmc_buffrst and is set when the CP_DMA_CNT register counts down to zero. The host interface 210 also generates a hst_cip_pci_done control signal that, when active (1), indicates that a DMA operation between POST_STAT registers and the host computer 110 is completed. The hst_cip_pci_done signal is cleared by the interface signal cmc_buffrst and is set when the CIP_DMA_CNT register counts down to zero. CMC Buffer Reset (cmc_buffrst) is a status signal that is used by Multi-Tasking Protocol Engine 250 to clear CIP_DMA_CNT register. When cmc_buffrst is active (1), the CMC SRAM address pointer is forced to a value of 0. CMC Buffer Reset corresponds to bit 0 in the CMC_DMA_CTL register and is self clearing.

A Host PCI Error Interrupt Status (hst_pci_err_int) signal indicates interrupt status from the host interface 210 and is an OR-function of the various errors in both send and receive sides of the host interface 210 operations. A Host to Command Channel Read Enable (hst_cmc_rden) signal is a control signal indicating when asserted that the host interface 210 will latch data bytes on cmc_rd_hdata[63:0] on every rising edge of the buffered PCI clock (hst_pclkb) signal where PCI bus 120 indicates the addressed destination is ready to accept data. A Host to Command Channel Write Enable (hst_cmc_wren) signal is a control signal indicating when asserted that the host interface 210 will transfer data into the command management channel 220 on every rising edge of hst_pclk signal where PCI bus 120 indicates the addressed source is ready to generate data.

The hardware control registers 320 include interrupt posting enable registers (IPEN[3:0]), read/write registers that are used to enable interrupt/status posting to memory of the host computer 110. Individual bits within the interrupt posting enable registers (IPEN[3:0]) permit selection of the status to be posted.

When a status bit in the posting status POST_STAT registers changes status from clear to set while MASTEREN bit in the Command register, CIP_DMAEN bit of CMC host real time clock, and the respective bit in IPEN[3:0] is set, the entire set of posting status POST_STAT[3:0] registers are posted to the host system memory. If interrupts are enabled with INTEN bit of CMC host control[2] register set, MASTEREN bit of Command[2] register set, POWERDN bit of CMC host control[3] register clear, and FAILDIS bit of Sequencer control[5] register clear, either of interrupts INTA# or INTB# is asserted after the status is posted. Interrupt INTA# or INTB# is selected based on the state of the DUAL_IRQ bit of host command[0] register. When a status bit is cleared in the posting status register POST_STAT[3:0], only the posting of the cleared status is performed and INTA# or INTB# is deasserted, if no other status bits are active.

When DUAL_IRQ bit of host command 0 register is clear, all interrupt requests are routed through INTA# and INTB# is not driven. When DUAL_IRQ bit of host command 0 register is set, normal interrupts such as command complete use INTA# while abnormal interrupts such as internal parity error use INTB#.

CIP_DMAENACK bit of CMC host real time clock register is used as a global status posting enable bit. If CIP_DMAEN bit of CMC host real time clock register is not set, no status posting is performed and INTA# or INTB# is asserted immediately, when appropriate.

INTEN bit of CMC host control[2] register, MASTEREN bit of Command[2] register, POWERDN bit of CMC host control [3] register, and FAILDIS bit of sequencer control [5] register are used as a global interrupt enabling function when all are set.

The device driver typically sets the contents of interrupt posting enable registers (IPEN[3:0]) at host system initialization.

Individual bits of the interrupt posting enable registers (IPEN[3:0]) include a plurality of enable bits. For interrupt and CIP DMA posting to occur with respect to each of the plurality of enable bits, CIP_DMAEN bit of CMC host real time clock register and INTEN bit of CMC host control [2] register are to be set.

A PCI error interrupt/status posting enable PCI_ERR_INT_IPEN bit, when set, enables both interrupt and status posting for PCI_ERR_INT bit of posting status POST_STAT registers. A hardware error interrupt/status posting enable HW_ERR_INT_IPEN bit, when set, enables both interrupt and status posting for HW_ERR_INT bit of posting status POST_STAT registers. Firmware error interrupt/status posting enable FW_ERR_INT_IPEN bit, when set, enables both interrupt and status posting for FW_ERR_INT bit of posting status POST_STAT registers. A sequencer interrupt/status posting enable SEQ_INT_IPEN bit, when set, enables the MTPE interrupt and status posting for SEQ_INT bit of posting status POST_STAT registers. An external interrupt/status posting enable EXT_INT_IPEN bit, when set, enables both interrupt and status posting for EXT_INT bit of posting status POST_STAT registers. A CTRC host interrupt/status posting enable CTRC_HST_INT_IPEN bit, when set, enables both interrupt and status posting, for CRTC_HST_INT bit of posting status POST_STAT registers. A break address interrupt/status posting enable BRKINT_IPEN bit, when set, enables both interrupt and status posting for BRK_INT bit of posting status POST_STAT registers. A sequencer LIP interrupt/status posting enable SEQ_LIP_INT_IPEN bit, when set, enables both interrupt and status posting for SEQ_LIP_INT bit of posting status POST_STAT registers. An ALC interrupt/status posting enable ALC_INT_IPEN bit, when set, enables both interrupt and status posting for ALC_INT bit of posting status POST_STAT registers. A host pause top acknowledge status posting enable HPAUSETOPACK_IPEN bit, when set, enables only the status posting for HPAUSETOPACK bit of posting status POST_STAT registers. A host pause acknowledge status posting enable HPAUSEACK_IPEN bit, when set, enables; only the status posting for HPAUSEACK bit of posting status POST_STAT registers.

The hardware control registers 320 include a command channel DMA control register, CMC_DMA_CTL. The command channel DMA control register, CMC_DMA_CTL, is a read/write register for controlling hardware in the command management channel 220. CMC_DMA_CTL is initialized with all register bits forced to zero when RST# or CHIPRST are active. Clearing a CMC_DMA_CTL bit halts transfers without losing data, status, or byte count. Transfers may be continued after halting. Reading a CMC_DMA_CTL bit supplies status information indicating the state of the hardware. When a CMC_DMA_CTL bit is cleared, the bit must be read back as zero before the transfer is guaranteed to have halted.

Bit 7 of CMC_DMA_CTL is CC_DMAEN[ACK], a Command Channel Buffer RAM <> CIOBUS DMA Enable/Acknowledge bit. When CC_DMAEN is set, data transfers between CMC Buffer and the CIOBUS device space are enabled. Bit 6 of CMC_DMA_CTL is CIP_DMAEN [ACK], a Command Channel Interrupt Status DMA Enable/Acknowledge bit. When CIP_DMAEN is set, CIP_DMAEN enables the automatic interrupt status update of the HCN-TRL[1:] and INSTAT registers into the PCI system memory 102. The CIP DMA Address registers in the hardware interface module 118 are initially set for an allocated location in system memory 102 prior to activating CIP_DMAEN. Clearing CIP_DMAEN disables automatic status update. If an update is in progress upon clearing CIP_DMAEN, the complete status is updated and remains until enabled again. Reading CIP_DMAEN supplies status information indicating the state of the hardware. When CIP_DMAEN is cleared, CIP_DMAEN must be read back as zero before the transfer is guaranteed to have halted. When CIP_DMAEN is disabled, status changes will only activate the host computer 110 via the IRQA[1:0]# lines if INTEN=1 & FAILDIS=0 & POWRDN=0. If so, the host computer 110 is to perform an access of the POST_STAT registers to determine the cause of the interrupt.

Bit 5 of CMC_DMA_CTL is CM_DMAEN[ACK], a Command Channel Buffer RAM <> Memory Port (TCB) DMA Enable/Acknowledge bit. When CM_DMAEN is set, CM_DMAEN enables the data transfers between CMC Buffer and the Memory port.

Bit 4 of CMC_DMA_CTL is CP_DMAEN[ACK], a Command Channel Buffer RAM <> PCI DMA Enable/Acknowledge bit. When CP_DMAEN is set, CP_DMAEN enables the data transfers between the CMC Buffer RAM and the PCI system memory.

Bit 3 of CMC_DMA_CTL is not used and always reads 0. Bit 2 of CMC_DMA_CTL is CIP_RD_DIS, a CIP read disable bit. The default value for CIP_RD_DIS is 0 so that posting of a four-byte status using PCI-write follows a PCI-read. When CIP_RD_DIS is set to 1 only an 4-byte PCI-write takes place and no PCI-read follows.

Bit 1 of CMC_DMA_CTL is CMC_DIR[ACK], a Command Channel DMA Direction/Acknowledge bit. CMC Direction Acknowledge (cmc_dirack) is a status bit that is readable from the CMC_DMA_CTL register. When cmc_dirack is active (1), the transfer direction is from PCI bus interface 320, through CMC SRAM into the TCB array. When cmc_dirack is inactive (0), the transfer direction is from CMC SRAM into PCI bus interface 320. CMC_DIR, when set to 1, conditions 1–128 byte data transfers to be directed from the PCI system memory 102 to the CMC Buffer (128 bytes size), or from the CMC Buffer to the external memory port (TCB SRAM), or from CMC Buffer to the CIOBUS device. CMC_DIR, when set to 0 and thus not active, conditions data transfers to be from the external memory port of the CMC Buffer, or from the CIOBUS device to CMC Buffer, or from the CMC Buffer to the PCI system memory. When CP_DMAEN[ACK] is inactive, the multi-tasking protocol engine 250 may both read and write the CMC Buffer using CMC_BFDAT without regard for the state of the CMC_DIR bit. The state of CMC_DIRACK; does not change unless the CP_DMAEN, CM_DMAEN and CC_DMAEN bits are cleared.

Bit 0 of CMC_DMA_CTL is CMC_BUFFRST, a Command Channel Buffer Reset bit. CMC_BUFFRST when written to 1 forces the CMC SRAM address pointer to a value of 0. CMC_BUFFRST is self-clearing. The hardware control registers 320 also include a command channel status byte register, CMC_STATUS0. CMC_STATUS0 is a read-only register that indicates the status of hardware in the command management channel 220.

The command management channel 220 interfaces to the address space of the Multi-Tasking Protocol Engine 250 with a hard pause, and top of idle loop pause access functionality.

The hardware control registers 320 also include host new TCB queue offset registers HNCTCB_QOFF1 and HCNTCB_QOFF0 and sequencer new TCB queue offset registers SNCTCB_QOFF1 and SCNTCB_QOFF0 that are used for TCB delivery between the host computer 110 and the multi-tasking protocol engine 250. The TCB delivery system indicates if any TCBs are available for the multi-tasking protocol engine 250 to process and, if so, how many. Only the host system writes to the host new TCB queue offset registers HNCTCB_QOFF1 and HCNTCB_QOFF0. The difference between the values in the host new TCB queue offset registers and the sequencer new TCB queue offset registers indicates that TCBs are available for the multi-tasking protocol engine 250 to process and the number to be processed. While any difference exists, TCB_AVAIL bit 325 in the CMC status register is set.

The sequencer new TCB queue offset registers SNCTCB_QOFF1 and SCNTCB_QOFF0 are typically read by the multi-tasking protocol engine 250. A byte read operation from the low byte SCNTCB_QOFF0 simply reads a low half of a TCB count value. A byte read operation from the high byte SCNTCB_QOFF1 supplies a high half of a TCB control value and increments the combined value of the two bytes by one. A word read operation supplies both halves to form the complete TCB count value and also increments the combined value of the two bytes by one. The sequencer new TCB queue offset registers SNCTCB_QOFF1 and SCNTCB_QOFF0 are only written by either the multi-tasking protocol engine 250 or the host computer 110, typically for initialization or diagnostic purposes, so that the written value beci)mes the valid value. The sequencer new TCB queue offset registers SNCTCB_QOFF1 and SCNTCB_QOFF0 indicate whether TCBs are available for processing by the multi-tasking protocol engine 250 and, if so, how many. The maximum value of the SNCTCB_QOFF1 and SCNTCB_QOFF0 registers are set by the TCB queue size register. When the value in SNCTCB_QOFF1 and SCNTCB_QOFF0 is zero. The SNTCB_ROLLOVER bit of the CMC status register is set.

The command management channel 220 supports internal CIOBUS 308 access arbitration between the host interface 210, the multi-tasking protocol engine 250, and the CMC CIOBUS DMA operations. Bit 7 of CMC_STATUS0 is HPAUSETOP, a Host Pause Top bit which is located in the write portion of the HPAUSETOP/ACK bit. Writing a 1 to HPAUSETOP issues a pause top request to the multi-tasking protocol engine 250 to pause at the top of the idle loop. The multi-tasking protocol engine 250 may be unpaused by writing a 0 to both HPAUSETOP and HPAUSE (bit [6] of CMC_STATUS0). Bit 7 of CMC_STATUS0 is also HPAUSETOPACK, a Host Pause Top Acknowledge bit which is located in the read portion of the HPAUSETOP/ACK bit. When the multi-tasking protocol engine 250 asserts; the SEQ_PAUSETOPACK signal, HPAUSETOPACK is set. The status of HPAUSETOPACK is also reflected in POST_STAT0[1]. The default value for HPAUSETOPACK is 0.

Bit 6 of CMC_STATUS0 is HPAUSE[ACK], a Host Pause/Acknowledge bit. HPAUSE, when set to 1, issues a pause request to the multi-tasking protocol engine 250 to pause as soon as possible at the end of an instruction. When seq_pausetopack is returned, the HPAUSEACK status bit is set. The multi-tasking protocol engine 250 may be unpaused by writing a 0 to both HPAUSETOP and HPAUSE bit. The host computer 110 only uses HPAUSE when current activity of the Multi-Tasking Protocol Engine 250 is not important, otherwise HPAUSETOP is used. The status bit HPAUSEACK is reflected in the POST_STAT0 register and has a default value of 1. Bit 5 of CMC_STATUS0 is reserved and always reads 0.

The command management channel 220 supports multiple host access lock support for access to host adapter 140 device registers. Bit 4 of CMC-STATUS0 is ACC_TOKEN, a Software Access Token bit. The access token bit supplies a software lock functionality for exclusively accessing host adapter 140 device registers in a controlled multiple-host environment. Hosts attempting to access the device space registers read a "1" value before accessing the host adapter 140. ACC_TOKEN is immediately cleared upon reading a "1". ACC_TOKEN is to be written back to "1" to release the lock.

Bit 3 of CMC_STATUS0 is POWRDN, a Power Down bit. When active (=1), POWRDN delegates the use of clock input REF_CLKIN and selected PCLK input tree elements. POWRDN also disables IRQA[1:0]# from assertion and limits device register access to PCI Host-only registers. Prior to placing POWRDN in the active state, software ensures that all DMAEN[ACK] bits are in the inactive state and HPAUSEACK is in the active state from a latched PAUSE condition to prevent error transfer. A hardware interlock prevents writing a 0 to the HPAUSE and HPAUSETOP bits while writing a 1 to the POWRDN bit.

Bit 2 of CMC_STATUS0 is INTEN, an Interrupt Enable bit. The interrupt enable bit, when active, allows active interrupt conditions stored in the host adapter 140 to assert the IRQA[1:0]# pin if the MASTEREN bit in the Configuration Command register is active.

Bit 1 of CMC_STATUS0 is FC_CHIPRST, a Fibre Channel Chip Reset bit. FC_CHIPRST is used by hardware interface module 118 to generate hst_fc_por_1 signal which, in turn, is used by SFC 282, RFC 272, or ALC 265 to reset only associated state machines. When the FC_CHIPRST register bit is set, the command management channel 220 generates a 1-pclk duration CMC Fibre Channel Clip Reset (cmc_fc_chiprst_1) signal and sends the signal to the host interface 210. The host interface 210 responds by generating the hst_fc_por_1 signal. The assertion of RST# of PCI bus 120 also generates the hst_fc_chiprst_1 signal. The FC_CHIPRST register bit is in the HIO address space so that cmc_fc_chiprst_1 is synchronized to pclk.

Bit 0 in the write portion of CMC_STATUS0 is CHIPRST, a Chip Reset bit. CHIPRST, when written to 1, produces the same condition as an asserted RST# to cause the device, except for the Configuration register space and the logic initialized by FC_CHIPRST, to enter an initialized state. Following a write to CHIPRST or the deassertion of RST#, POR (the internal device reset condition) remains active for two to three CLKIN periods before becoming inactive. Bit 0 in the read portion of the CMC_STATUS0 register is CHIPRST, a Chip Reset Acknowledge bit. CHIPRST, when active, indicates a write to CHIPRST has occurred or that RST# has been asserted. CHIPRSTACK remains active until an explicit writing of "0" to CHIPRST has occurred if POR, the internal device reset condition, has terminated. When the CHIPRST register bit is set, the command management channel 220 generates a 1-pclk duration, active-low CMC Chip Reset (cmc_chiprst_1) signal and sends the signal to the host interface 210 which responds by generating a hst_por_1 signal. The CHIPRST register bit is in the HIO address space so that cmc_chiprst_1 is synchronized to pclk.

The interrupt posting status registers 322 include Posting Status Byte [3:0] (POST_STAT[3:0]), a four-byte readable global register. The POST_STAT[3 :0] registers contains status condition information for posting to memory in the host computer 110. When CIP_DMAEN=1 and the status posting update is enabled by interrupt posting enable IPEN [3:0] registers, the entire 32-bit POST_STAT[3:] set of status conditions are posted to the host memory. The posting of status conditions may be followed by readback and compare operations to ensure proper posting prior to issuing the appropriate IRQA# to the host. Several bits are reserved in the four-byte status register for future expansion.

Posting Status Byte 0 (POST STAT[0]) register is enabled by IPEN[0] register. Bits 2, 4–7 are reserved and always read 0. Bit 3 of POST_STAT[0] is ALC_INT, an ALC Interrupt Status bit. ALC_INT is set upon reception of a rising edge of the alc_int signal and indicates that the ALC module needs the attention of the host computer 110. Any ALC activity that requires host computer 110 intervention asserts the alc_int signal. When set, ALC_INT asserts IRQA[0]# after CIP DMA, if enabled.

Bit 1 of POST_STAT[0] is HPAUSETOPACK, a Host Pause Top Acknowledge bit. HPAUSETOPACK is set when seq_pause_ack is returned with the HPAUSETOP bit set in CMC_HCTL register. HPAUSETOPACK status for both activation and de-activation is posted in host computer 110 memory but no IRQA# is issued. Bit 0 of POST_STAT[0] is HPAUSEACK, a Host Pause Acknowledge bit that is set when seq_pause_ack is returned with the HPAUSE bit set in CMC_HCTL register. HPAUSE status for both activation and de-activation is posted in Host memory but no IRQA# is issued.

Posting Status Byte 1 (POST_STAT[1]) register is enabled by IPEN[1] register. Bit 7 of POST_STAT[1] is PCI_ERR_INT, a PCI Error Interrupt bit that is set when any PCI related errors occur, including errors listed in STATUS 1, the PCI configuration register. PCI_ERR_INT is cleared by writing to the CLR_INT register with CLR_PCIERR bit (=1). When set, PCI_ERR_INT asserts IRQA [1]# after CIP DMA, if enabled.

Bit 6 of POST_STAT[1] is HW_ERR_INT, a Hardware Error Interrupt bit that is set when any hardware error occurs including unmasked internal data parity error(s). Sources of parity errors are MPARERR, SQPARERR, CMC, RAMPERR, SFC_DSSPARERR, RPB_DRCPARERR, HST_DRHPARERR, ILLOP-CODE, ALC_HW_INT, RFC_HW_INT and SFC_HW_INT. HW_ERR_INT is cleared by writing to the CLRINT register with CLR_PARERR bit (=1). When set, HW_ERR_INT asserts IRQA [1]# after CIP DMA, if enabled.

Bit 5 of POST_STAT[1] is SW_ERR_INT, a Software Error Interrupt bit that is set when a seq_illopcode signal occurs. SW_ERR_INT is cleared by writing; to the CLRINT1 register with CLR_SW_ERR_INT bit set to 1. When set, SW_ERR_INT asserts IRQA[0]# after CIP DMA, if enabled.

Bit 4 of POST_STAT[1] is SEQ_INT, a SEQUENCER INTERRUPT bit that is set when the seq_int bit in CMC_SEQ_RTC 1 register is set. SEQ_INT is cleared by writing to the CLRINT register with CLR_SEQ_INT bit set to 1. When set, SEQ_INT asserts IRQA[0]# after CIP DMA, if enabled.

Bit 3 of POST STAT[ 1] is EXT_INT, an External Interrupt bit that is set when the EXT_INT pin is active. The MPI module passes EXT_INT to the CMC to set EXT_INT, if INTEN is active. EXT_INT is cleared by writing to the CLRINT register with CLR_OTHER_INT bit set to 1. When set, EXT_INT asserts IRQA[1]# after CIP DMA, if enabled.

Bit 2 of POST_STAT[1] is CRTC_HST_INT, a CMC Real-Time-Clock Host Interrupt bit that is set when the CMC RTC timer expires. CRTC_HST_INT is cleared by writing to the CLRINT register with CLR_OTHER_INT bit set to 1. When set, CRTC_HST_INT asserts IRQA[1]# after CIP DMA, if enabled. The command management channel 220 includes a CMC Real Time Clock (CRTC) that is optionally used by a host driver in place of system timers. The CRTC has a time base that is adjustable and the status that is included in the POST_STAT[1] register. In an illustrative embodiment, the CRTC supports a timer value from 1 ms to 1 second.

Bit 1 of POST_STAT[1] is BRK_INT, a Break Address Interrupt bit that becomes active (1) when using the hardware breakpoint feature. Note when the current sequencer instruction breakpoint is an access to an TCB Array address, the sequencer instruction may be stretched while internal arbitration is performed for the external memory port access, and a PAUSE request due to an active BRK_INT is delayed until arbitration is completed. Typically MOV instructions delay BRK_INT until the MOV CNT has expired. BRK_INT is also delayed or prevented from being active for selected conditions as follows. First, the program counter of the sequencer and the break address are equal and the Breakpoint feature is enabled (BRKDIS=0) in a normal, expected case. Second, other hardware-detected errors are active (FAILDIS=0). While the BRK_INT bit is active, the PAUSE bit in HCNTRL register is forced to be active and IRQA[1]# is forced to be asserted when INTEN and MASTEREN are active and POWRDN is inactive. When BRK_INT is active due to source 1, BRK_INT may be set inactive by a write to the CLRINT register with CLR_BRK_INT bit 3 set to 1. For case 2, the hardware error condition is to be corrected before continued use of the hardware break address feature.

Bit 0 of POST STAT[1] is SEQ_LIP_INT, a Sequencer LIP Interrupt bit that is set by the multi-tasking protocol engine 250 to inform the hardware interface module 118 that the LIP TCB is needed.

Posting Status Bytes 2 and 3 (POST_STAT[2:3]) registers are POST_STAT_RSVD, registers that are currently reserved for more interrupt/status posting. All bits are unused and read 0.

The command management channel 220 handles signals including host interface signals, sequencer (MTPE) interface signals, memory port interface (MPI) signals, send frame control (SFC) interface signals, receive frame control (SFC) interface signals, arbitrated loop control interface signals, host interface signals (HST), and command management channel interface signals.

Command Delivery Operations

The command management channel 220 transfers transfer control blocks (TCBs) to and from the PCI system memory 102. When a TCB is sent to the CMC SRAM, the multi-tasking protocol engine 250 sets up a DMA operation by loading a TCB PCI system memory host address and byte count into control registers in the host interface 210 including registers CP_DMA_HADR, CP_DMA_LADR, and CP_DMA_CNT. At the same time, registers (TCB_PTR and DMA_TCB_INDEX) in memory port interface 230 block are also set up as the destination of the DMA operation. CM_DMA_CNT, a DMA transfer count of data communicated between the CMC SRAM and the memory port interface 230, is used to detect differences in PCI DMA count between the CMC SRAM and the TCB SRAM. When a full transfer control block, including a TCB and S/G list elements, is sent into the external TCB SRAM, the register DMA_TCB_INDEX is initialized to zero to begin writing to the start of the TCB space of the TCB page. When only the S/G list is sent to the external TCB SRAM, the DMA_TCB_INDEX is set to begin writing to the S/G half of a TCB page. The CMC DMA channel is enabled through the CP_DMAEN and CM_DMAEN register bits along and the data direction is set using the CMC direction register, CMC_DIR. A status bit CMC_DONE is only set when the DMA transfer between the PCI bus interface 320 and the CMC buffer, and the DMA transfer between the CMC buffer and the external TCB SRAM are both completed. The two DMA operations are separate hardware operations that are performed in a sequence.

DMA transfers between the PCI bus interface 320 and the command management channel 220 buffer are requested for any count from 1 to 128 bytes. DMA performance is increased by transferring data in PCI cache-line sized blocks that are Dword aligned to improve internal byte-offset alignment and possibly reduce system memory access times. Byte alignment to and from the PCI system memory 102 and CMC Buffer is performed in the host interface 210. Write data from .PCI system memory 102 and read data from TCB SRAM always begins at the CMC Buffer byte 0 location for the first byte. Byte alignment to and from external SRAM is performed to align data for external SRAM <> CMC Buffer DMA operation. For read operations from CMC Buffer, the first byte is always read from the byte 0 location of the CMC Buffer and aligned to the external SRAM based on the starting external SRAM address. For data written to the CMC Buffer from external SRAM, the first byte is always placed in the CMC Buffer byte 0 location so that initial alignment may be needed.

DMA transfers between the TCB SRAM and the command management channel 220 buffer are also requested from any count from 1 to 128 bytes. CP_DMA_CNT and CM_DMA_CNT are usually the same value and therefore loaded at the same time with the same value. However, the multi-tasking protocol engine 250 sometimes changes the CM_DMA_CNT if less than all TCB data bytes are to be transferred to the TCB SRAM. DMA_TCB_INDEX is advantageously initialized to an even value since the memory port has a 16-bit width. An odd-valued beginning DMA_TCB_INDEX value is permitted but degrades transfer performance since the internal DMA operation is performed using an 8-bit data path width to the external SRAM rather than the 16-bit path. Registers CP_DMA_CNT and CM_DMA CNT are set to odd byte count values without performance degradation. When the command management channel 220 writes data to the TCB SRAM and CM_DMA_CNT is set to a count value less than CP_DMA_CNT, the command management channel 220 buffer is left pointing at the last untransferred byte and the multi-tasking protocol engine 250 may access the remaining data in the command management channel 220 buffer via a CMC_BDAT[1:0] one-byte port (not shown). When the command management channel 220 writes to an external SRAM, CM_DMA_CNT cannot be higher than CP_DMA_CNT.

The memory port interface 230 is expected to increment the DMA_TCB_INDEX to generate actual memory address (MA) lines. A DMA. transfer between command management channel 220 and the external TCB SRAM uses a data path other than the CIOBUS 308 and has a lower priority than a transfer in which the multi-tasking protocol engine 250 utilizes the memory port interface 230. A request from the host computer 110 is serviced only after the PCI DMA transfer is complete and the CM DMA transfer to the memory port interface 230 is in progress;, an unlikely event so that host access to the memory port interface 230 is granted an even lower priority.

TCB Delivery Operations

A set of registers in the command management channel 220 are designed to support TCB delivery operations. The registers include a host new TCB queue offset byte register HNTCB_QOFF[1:0] and a SEQ new TCB queue offset byte SNTCB_QOFF[1:0] for a new TCB queue that serve as a handshake between the host computer 110 and the multi-tasking protocol engine 250. The Host TCB Delivery (HNTCB_QOFF) register enables the host computer 110 to indicate that a new TCB has been prepared in system memory for delivery to the TCB SRAM. HNTCB_QOFF is written by the host computer 110 with a value that is the sum of the current HNTCB_QOFF plus the number of new TCBs that have been added to the new TCB queue in system memory. The MTPE TCB Delivery (SNTCB_QOFF) register is an incrementing counter. The SNTCB_QOFF count value is compared with the value stored in the HNTCB_QOFF register. When the count is not equal, a TCBAVAIL status signal is sent to the Multi-Tasking Protocol Engine 250. As a result, the Multi-Tasking Protocol Engine 250 reads the SNTCB_QOFF register for the pointer to the TCB to be downloaded from the system memory new TCB queue. The read causes the value in SNTCB_QOFF register to increment.

The TCB queues are maintained in the system memory 102. When new TCBs are available to be sent to the multi-tasking protocol engine 250, the hardware interface module 118 writes to the HNTCB_QOFF register to post a number indicating the total number of new TCBs. The hardware interface module 118 maintains an image of the posted number in system memory 102. The command management channel 220 hardware generates a TCB_AVAIL status bit to inform the multi-tasking protocol engine 250 that new TCBs are available for processing. The TCB_AVAIL status bit is set when HNTCB_QOFF register is not equal to SNTCB_QOFF register. When the multi-tasking protocol engine 250 is really to download a new TCB, the multi-tasking protocol engine 250 reads and increments SNTCB_QOFF register. When SNTCB_QOFF is equal to HNTCB_QOFF, no additional TCBs are available for processing. A rollover status SNTCB_ROLLOVER is set when the TCB queue in system memory 102 rolls over, indicating that SNTCB_QOFF is equal to zero. The size of the TCB queue is defined in the TCB_QSIZE register.

For the done TCB queue, only the queue offset is provided for the multi-tasking protocol engine 250 and is maintained in the SDTCB_QOFF register. The queue offset maximum value is determined by the TCB_QSIZE register. A SDTCB_ROLLOVER register bit supplies another rollover status bit. The value in the SNTCB_QOFF is the pointer to the next entry in the done queue to post a completed TCB status.

SEQ Pause/SEQ Pauseack Protocol

CIOBUS 308 accesses pause the multi-tasking protocol engine 250 prior to accessing a CIOBUS device. The CIOBUS 308 has three possible "owners" including the multi-tasking protocol engine 250, the host computer 110, and the command management channel 220. The command management channel 220 utilizes the CIOBUS 308 for various purposes including downloading multi-tasking protocol engine 250 firmware, and direct DMA access of CIOBUS 308 devices.

An internal arbiter determines ownership of the CIOBUS 308 using the status of the HPAUSE register bit the status of the CMC-CIOBUS DMA request signal. HPAUSE bit is "on" by default at power-up indicating that the multi-tasking protocol engine 250 is paused or stopped so that the CIOBUS master is the host computer 110. The HPAUSE bit functions as a hpause_request to the CIOBUS arbiter. The highest priority is the CMC-CIOBUS DMA transfer. Second priority is the host-CIOBUS transfer. The Multi-Tasking Protocol Engine 250 is continuously the master when the other two masters have not requested and won master status.

Figure 4A:
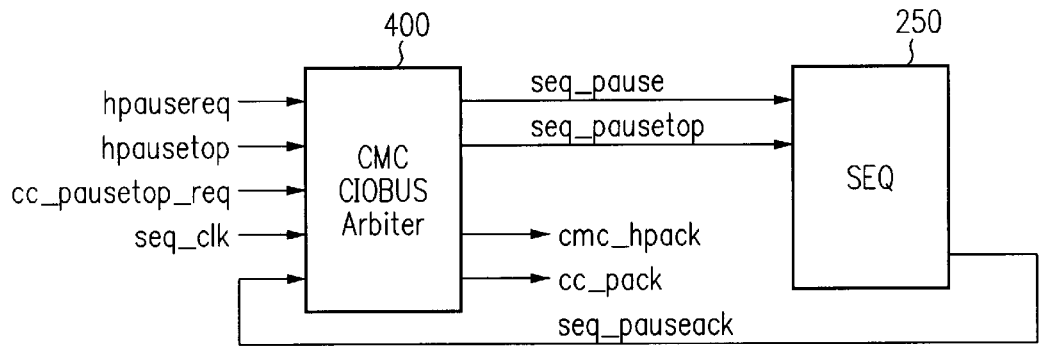
FIGS. 4A and 4B are a schematic block diagram and a timing diagram, respectively, that illustrate operation and signals of the CIOBUS arbiter.
Figure 4B:
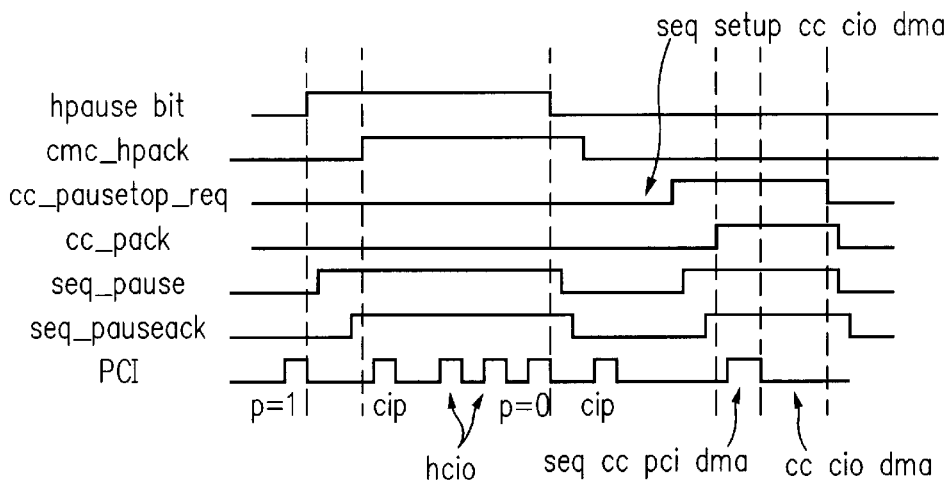

Referring to FIGS. 4A and 4B, a schematic block diagram and a timing diagram respectively illustrate operation and signals of the CIOBUS arbiter 400. CIOBUS arbiter 400 controls operation of CIOBUS arbitration.

CMC to CIOBUS Device Space DMA Operation

The command management channel 220 to CIOBUS 308 DMA operation is primarily used to download sequencer firmware by DMA transfer into the microcode RAM space (sequencer memory 1142 shown in FIG. 11) of the multi-tasking protocol engine 250. The command management channel 220 to CIOBUS 308 DMA operation also allows access to any CIOBUS device using the CIOBUS DMA operation command management channel 220. The hardware interface module 118 generally loads sequencer firmware by pausing the multi-tasking protocol engine 250, establishing an address in the sequencer memory 1142, and placing the multi-tasking protocol engine 250 in a LOADRAM mode in sequencer register set 1120 prior to initializing the sequencer firmware DMA operation.

The hardware interface module 118 with Multi-Tasking Protocol Engine 250 in a paused state prepares the DMA operation for firmware downloading by initializing the registers CC_DMA_ADR and CC_DMA_CNT to a location in the sequencer memory 1142 and a total firmware byte count, respectively. The DMA operation is then enabled by setting CC_DMAEN and CP_DMAEN bits, initializing CP_ADDR and CP_CNT in host interface 210. When the DMA operation is complete, from system memory to CMC buffer, then from CMC buffer to CIOBUS and from CIOBUS into sequencer memory 1142, a CC_HDONE status bit and a CP_DONE status bit are activated and an interrupt status update DMA operation is issued to inform the hardware interface module 118 that the two DMA actions are completed. An HPACK bit is asserted if HPAUSE bit remains set to allow PHOST to access registers in the CIOBUS.

Interrupt Status Update Operation

The host adapter 100 supports three PCI REQ and GNT signal pairs, one each for the read data channel, write data channel, and command/interrupt channel. These three signal pairs are programmable and can be merged into one or two pairs to allow external priority control of the master accesses.

The interrupt status update operation is used to send status update to the hardware interface module 118 to minimize Host PIO activity while awaiting a change of status due to a previous write action or new status change. One example is operation of HPAUSE and HPAUSEACK register bits. When the HPAUSE register bit is set high from a previously low state, the CMC Interrupt Status DMA (CIP DMA) is performed if CIP_DMAEN and HPAUSE_PEN are both active. The CIP DMA operation is performed at the time the multi-tasking protocol engine 250 returns the SEQ_PAUSEACK, the internal PAUSE arbiter returns CMC_HPACK (Host Pause Acknowledge), the PCI internal DMA arbiter has granted the DMA priority to the command management channel 220, and the PCI GNT# is asserted with the host adapter 140 as master.

The CIP DMA operation is also initiated by several other sources identified in the POST_STAT[3:0] register bits. The four-byte (32-bit) status update of POST_STAT[3:0] is otherwise enabled individually through IPEN[3:0].

Most register bits in POST_STAT[3:0], excluding HPAUSEACK and HPAUSETOPACK, also assert PCI IRQA[O]# or IRQA[1]# when a new active status is received. If CIP_DMAEN is set, IRQA[1:O]# is only issued after the CIP DMA operation completes and status is posted into system memory 102. When the interrupt causing the status is cleared by the Host driver, the CIP DMA operation is not performed to update the cleared status in system memory. The hardware interface module 118 performs the clearing operation at the end of an interrupt service routine. IRQA# is removed if no additional active status conditions exist.

When CIP_DMAEN bit is deasserted, only the IRQA [1:0]# is issued immediately if INTEN=1, FAILDIS=0, POWRDN=0, and MASTEREN=1.

The CIP DMA operation on the PCI bus is a two-step DMA operation including (1) a DMA write operation to a preset system memory location, and followed immediately by (2) a DMA read and compare operation to ensure that status is posted into system memory 102. The two-step process prevents a possible effect of using a PCI bridge which may delay the initial write status update DMA. Also, if there is a mismatch in the status compare, the CIP DMA operation will be repeated since another status update has been received once the DMA is completed one of the IRQA[110] output signals will be issued.

Table I shows the various actions taken for the interrupt status posting and IRQA# assertion in which an INTEN condition refers to the condition INTEN=1, FAILDIS=0, POWRND=0, and MASTEREN=1.

TABLE I

|  | CIP_DMAEN | IPEN | INTEN | Action |
|---|---|---|---|---|
| *_INT active | 0 | x | 0 | no action |
| update | 0 | x | 1 | IRQ only |
|  | 1 | 0 | 0 | no action |
|  | 1 | 1 | 0 | CIP DMA only |
|  | 1 | 1 | 1 | CIP DMA then IRQ |
| *_INT clear | 0 | x | 0 | no action |
| update | 0 | x | 1 | IRQ removed if no others active. |
|  | 1 | 0 | 1 | IRQ only. IRQ removed if no others active |
|  | 1 | 1 | 0 | No action |
|  | 1 | 1 | 1 | CIP DMA only; IRQ removed if no others active. |
| HPAUSEACK | 0 | x | x | no action |
| active/clear | 1 | 0 | x | no action |
| update | 1 | 1 | x | CIP DMA only |

Multiple Host Access Lock Operation

The multiple host access lock feature is a simple software technique that attains exclusive access locking in a multiple host environment. In an access-lockable multiple-host environment, a host computer 110 seeking access to host adapter 140 device registers is constrained to read a "1" value from an ACC_TOKEN bit in the CMC_HCTL register prior to accessing the device registers. The command management channel 220 includes logic that immediately clears the ACC_TOKEN status bit to indicate to other hosts that the device registers are locked by a single host computer 110. Only the host computer 110 that "owns" the access lock mechanism realizes the ownership status. The owner accesses device registers and subsequently relinquishes ownership by writing a "1" to the CMC_HCTL register to return the ACC_TOKEN bit upon completion. The next host in line thus obtain rights to access lock capability. No control is supported that prevents non-granted hosts from directly accessing the device registers.

Command Management Channel DMA Operations

Figure 5:
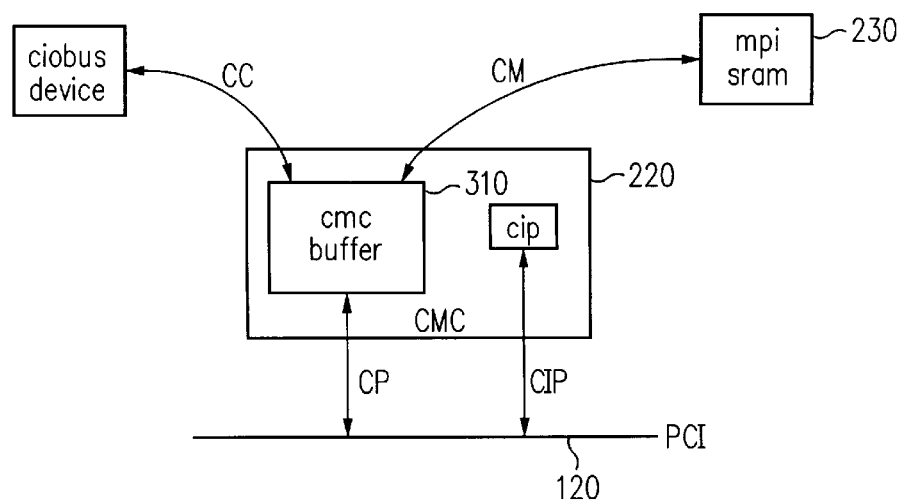
FIG. 5 is a schematic block diagram illustrating DMA operations supported by the command management channel.

Referring to FIG. 5, a schematic block diagram illustrates four DMA operations that are supported by the command management channel 220. The supported DMA operations include transfers between the command management channel 220 and a CIOBUS device, the command management channel 220 and SRAM in the memory port interface 230, the CMC buffer and the PCI bus interface 320, and the POST_STAT registers, and the PCI bus interface 320. Logic statements that follow describe the four DMA operations:

CMC/PCI/MPI DMA=CP & CM (cp_pci_req)

CMC/PCI DMA=CP (cp_pci_req)

CIP/PCI DMA=(cip_pci_req)

CMC/PCI/CIOBUS DMA=CC & CP (cc_pci_req).

Figure 6A:
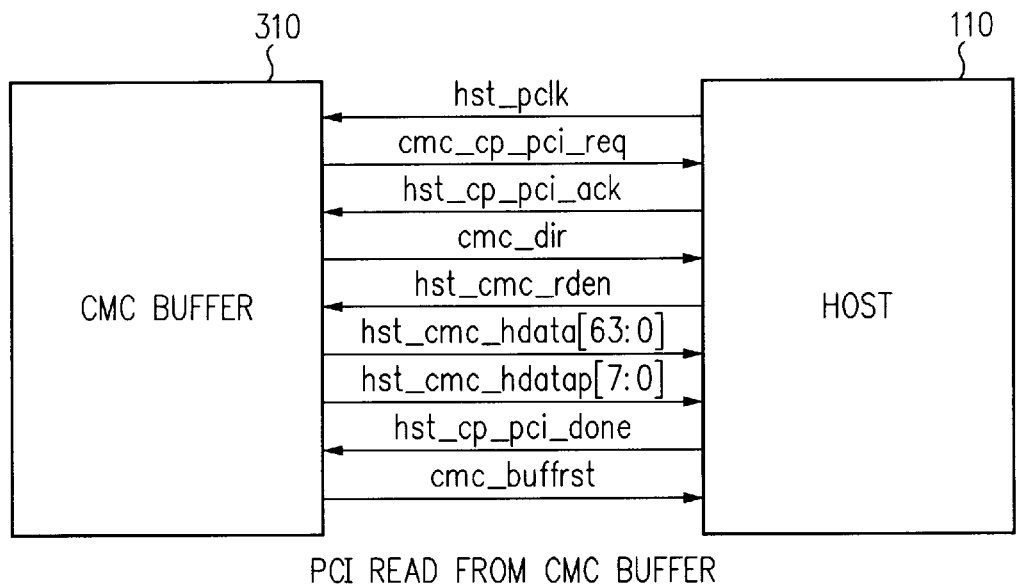
FIGS. 6A and 6B are schematic block diagrams illustrating a DMA channel between the CMC buffer and the host computer via the PCI bus interface.
Figure 6B:
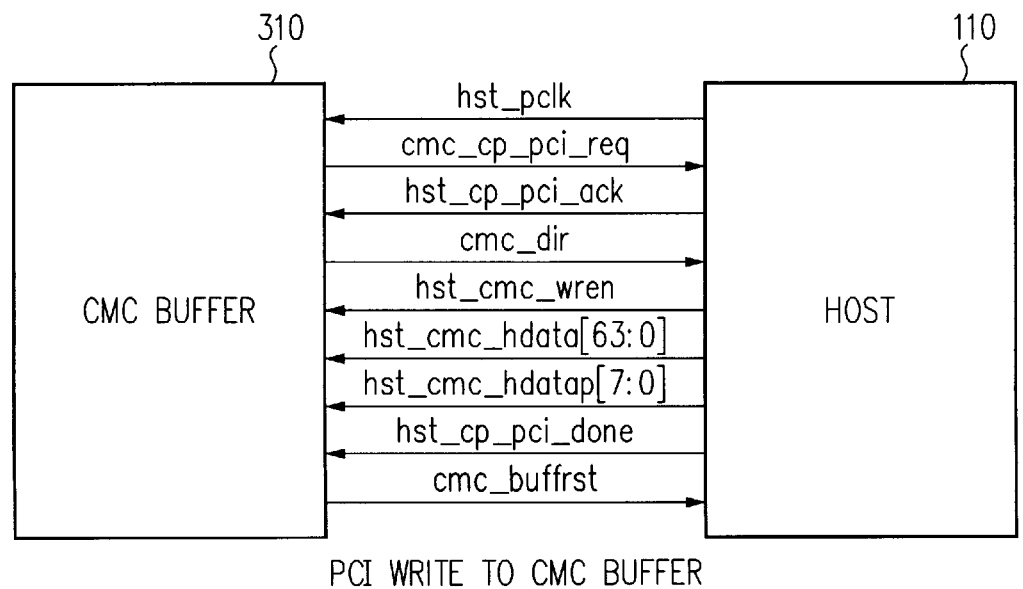

Referring to FIGS. 6A and 6B, schematic block diagrams illustrate a DMA channel between the CMC buffer 310 shown in FIG. 3 and the host computer 110 via the PCI bus interface 210. The DMA channel between the command management channel 220 and the PCI bus interface 210 is a 64-bit channel and, in the illustrative embodiment, DMA count values up to 128 are supported.

The DMA operation between the CMC buffer 310 and the PCI bus interface 320 includes a series of operations. First, the multi-tasking protocol engine 250 initializes a host address in the PCI system memory 102 in registers CP_DMA_HADR and CP_DMA_LADR, and initializes a byte count into the register CP_DMA_CNT. Second, to enable the DMA channel in the command management channel 220, CP_DMAEN bit 4 in CMC_DMA_CTL register is set and CMC_DIR bit 1 is controlled to define whether the operation is a read or write operation. CMC_BUFFRST bit 0 is set equal to 1 to force the CMC SRAM address pointer to 0.

In a third operation, command management channel 220 generates cmc_cp_pci_req and sends the signal to the host interface 210 in combination with cmc_dirack. Fourth, the host computer 110 generates hst_cp pci_ack when the internal arbiter gives priority to the CMC Buffer SRAM—PCI request and wins the PCI bus arbitration. Fifth, the host computer 110 generates hst_cmc_rden or hst_cmc_wren depending on the direction of the transfer (cmc_dirack) indicating that while asserted, the PCI bus interface 210 latches the data bytes on hst_cmc_hdata[63 :0] for the read direction, or transfers data into the CMC SRAM for the write direction on every rising edge of hst_pclk.

In a sixth operation, the host computer 110 tracks and decrements CP_DMA_CNT for each byte transfer. Host interface 210 generates hst_cp_pci done when the CP_DMA_CNT register count is down to zero. Finally, the command management channel 220 deasserts cmc_cp_pci_req and the host interface 210 deasserts hst_cp_pci_ack.

Figure 7A:
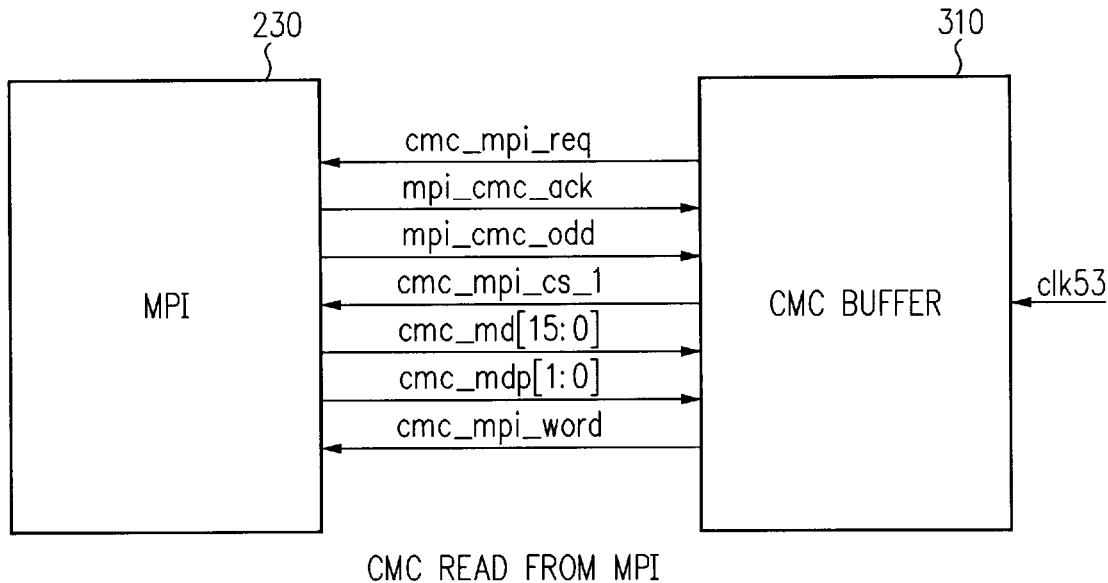
FIGS. 7A and 7B are schematic block diagrams illustrating a DMA channel between the CMC buffer and the memory port interface.
Figure 7B:
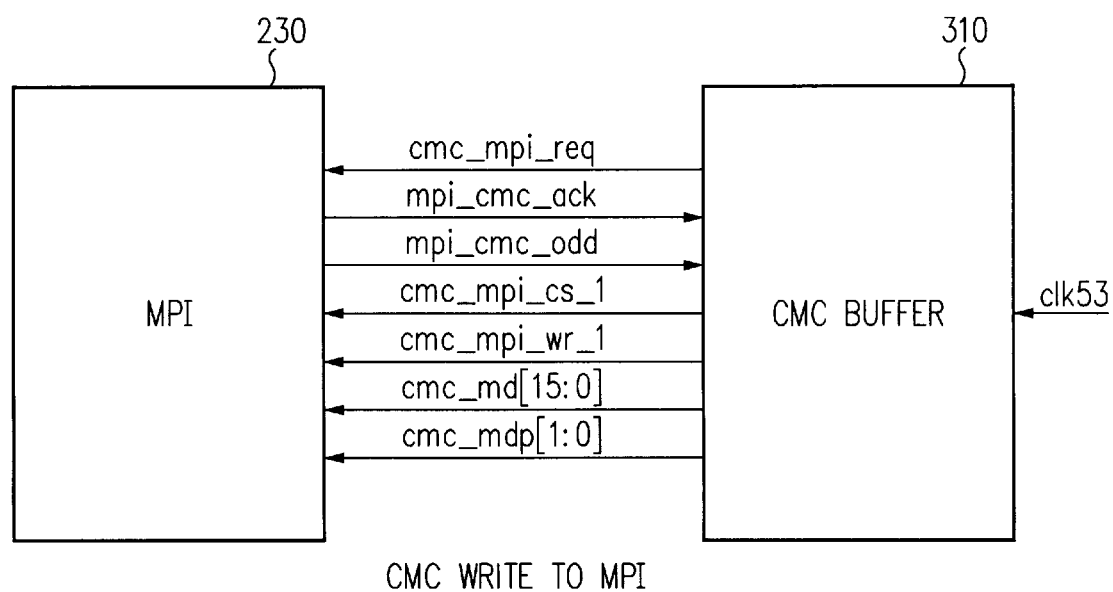

Referring to FIGS. 7A and 7B, schematic block diagrams illustrate a DMA channel between the CMC buffer 310 and the memory port interface 230. The DMA operation between PCI bus interface 210 and memory port interface 230 includes two DMA operations. The first operation is a DMA operation between PCI bus interface 210 and CMC SRAM 310 which is described with reference to FIGS. 6A and 6B. The second DMA operation is between CMC SRAM 310 and memory port interface 230 which is either an 8-bit or 16-bit DMA operation. The second DMA operation is synchronized with clk53 and not the hst_pclk. Th(second part of the DMA operation is between CMC SRAM 310 and memory port interface 230 is substantially the same as the operations for a transfer between PCI bus interface 210 and CMC SRAM 310 which is described with reference to FIGS. 6A and 6B.

In a first operation, multi-tasking protocol engine 250 initializes the host address in the PCI system memory 102 into CP_DMA_HADR and CP_DMA_LADR registers, and initializes the byte count into CP_DMA_CNT and CM_DMA_CNT registers. At the same time, TCB_PTR and DMA_TCB_INDEX registers in memory port interface 230 are also initialized to set the destination or source of the DMA operation. Second, to enable the CMC DMA channel, CP_DMAEN bit 4 and CM_DMAEN bit 5 in CMC_DMA_CTL register are set. CMC_DIR bit 1 defines whether the operation is a read operation or a write operation. CMC_BUFFRST bit 0 is set to 1 to force the CMC SRAM 310 address pointer to a value of 0. Operations three through 8 are the same as the operations for a transfer between PCI bus interface 210 and CMC SRAM 310.

In a ninth operation, the command management channel 220 generates cmc_mpi_req and sends the signal to memory port interface 230. In a tenth operation, the memory port interface 230 generates mpi_cmc_ack when the memory port is available for usage by the command management channel 220. Memory port interface 230 also may generate mpi_cmc_odd signal indicating that the MPI TCB index register is initialized to start from an odd byte address boundary. In an eleventh operation, the command management channel 220 generates cmc_mpi_wr_1 and cmc_mpi_cs_1 indicating that the CMC is writing the TCB SRAM during the CMDMA operation. For a read operation, command management channel 220 only generates cmc_mpi_cs_1 signal in conditions of which the TCB SRAM presents read data after the next clk53 rising edge.

In a twelfth operation, command management channel 220 also generates cmc_mpi_word signal. When active high, cmc_mpi_word indicates that the CMC is currently performing a word (16-bit) transfer to or from the TCB SRAM during the CMDMA operation. In a thirteenth operation, command management channel 220 tracks and decrements CM_DMA_CNT for every byte of transfer. The command management channel 220 generates the status bit CMC_DONE and deasserts cmc_mpi_req when the CM_DMA_CNT register counts down to zero. In a fourteenth operation, the memory port interface 230 deasserts mpi_cmc_ack.

Figure 8A:
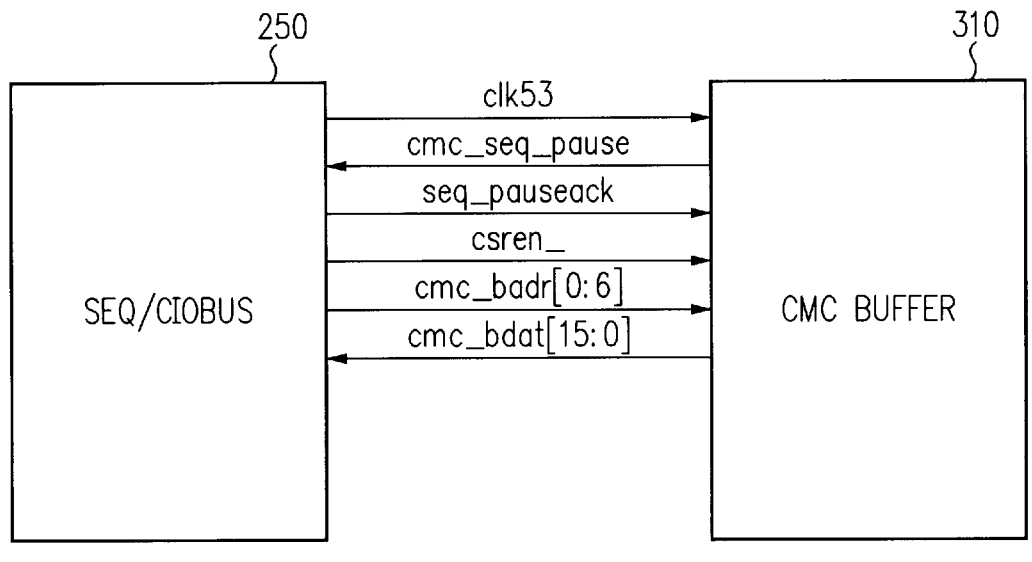
FIGS. 8A and 8B are schematic block diagrams illustrating a DMA channel between the PCI bus interface and the CIOBUS devices.
Figure 8B:
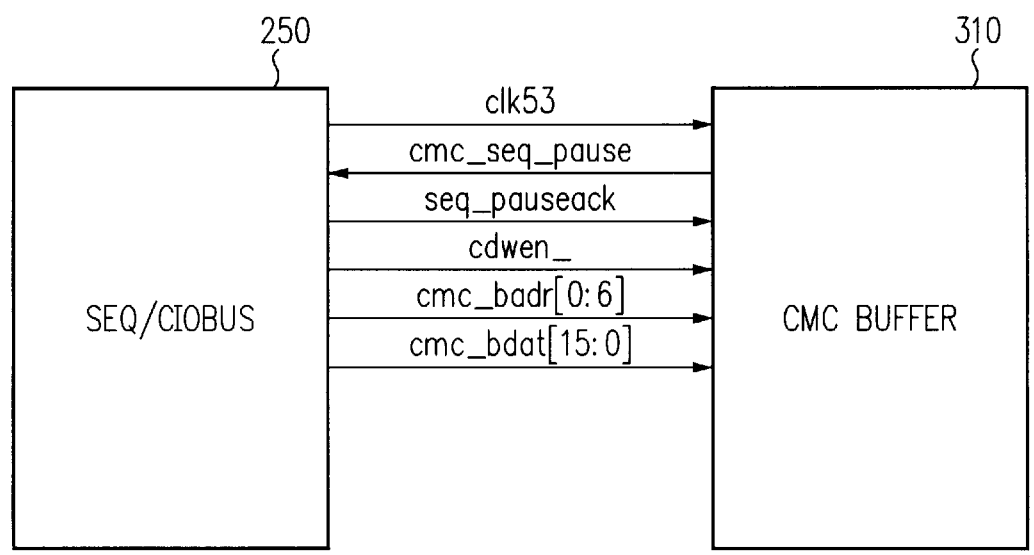

Referring to FIGS. 8A and 8B, schematic block diagrams illustrate a DMA channel between the PCI bus interface 210 and the CIOBUS devices. The DMA operation between PCI bus interface 210 and CIOBUS Devices includes two DMA operations. A first operation is the DMA operation between PCI bus interface 320 and CMC SRAM which is described with reference to FIGS. 6A and 6B. The second DMA operation is between CMC SRAM 310 and an CIOBUS Device. The second DMA operation is either an 8-bit or 16 bit operation. The second DMA operation is synchronized with clk53 and not hst_pclk. The first part of the second DMA operation is substantially the same as the operations for a transfer between PCI bus interface 210 and CMC SRAM 310 which is described with reference to FIGS. 6A and 6B.

In a first operation, multi-tasking protocol engine 250 initializes the host address in PCI system memory 102 into CP_DMA_HADR and CP_DMA 1,ADR registers, and initializes byte count into CP_DMA_CNT registers. At the same time, CC_DMA_ADR and CC_DMA_CNT registers are initialized to point to the SEQ RAM CIOBUS address and total firmware byte count respectively. In a second operation, to enable the CMC DMA channel, CP_DMAEN bit 4 and CC_DMAEN bit 7 in CMC_DMA CTL register are set. CMC_DIR bit 1 is valued to define whether the operation is a read or write operation. CMC_BUFFRST bit 0 is set to 1 to force the CMC SRAM address pointer to a value of 0. In a third operation, command management channel 220 generates cmc_cc_pci_req and sends the signal to the host interface 210 in combination with cmc_dirack. In a fourth operation, the host interface 210 generates hst_cc_pci_ack when the internal arbiter gives priority to the CMC Buffer SRAM <> CIOBUS pci_request and attains PCI bus arbitration. Operations five and six are the same as the operations for a transfer between PCI bus interface 320 and CMC SRAM.

In a seventh operation, command management channel 220 deasserts cmc_cc_pci_req. In an eighth operation, host interface 210 deasserts hst_cc_pci_ack. In a ninth operation, internal cc_pausetop_req signal is generated when CC_DMAEN[ACK] is set and CMC_CC_DONE is cleared. The cmc_ciobus arbiter then de-asserts cmc_hpack signal to inform the command management channel 220 to relinquish the CIOBUS. On the next sin_mpte_clk signal, the cmc_ciobus arbiter grants CMC control of the CIOBUS by asserting internal signal cc_pack. In a tenth operation, when the DMA operation is complete, from PCI to CMC SRAM and from CMC to CIOBUS, the CMC_CCDONE status bit 7 and CMC_CPDONE bit of CMC_STATUS register are set. In an eleventh operation, cc_pausetop_req is deasserted, causing the cc_pack signal to be deasserted and cmc_hpack to be asserted. The multitasking protocol engine 250 remains paused.

Figure 9:
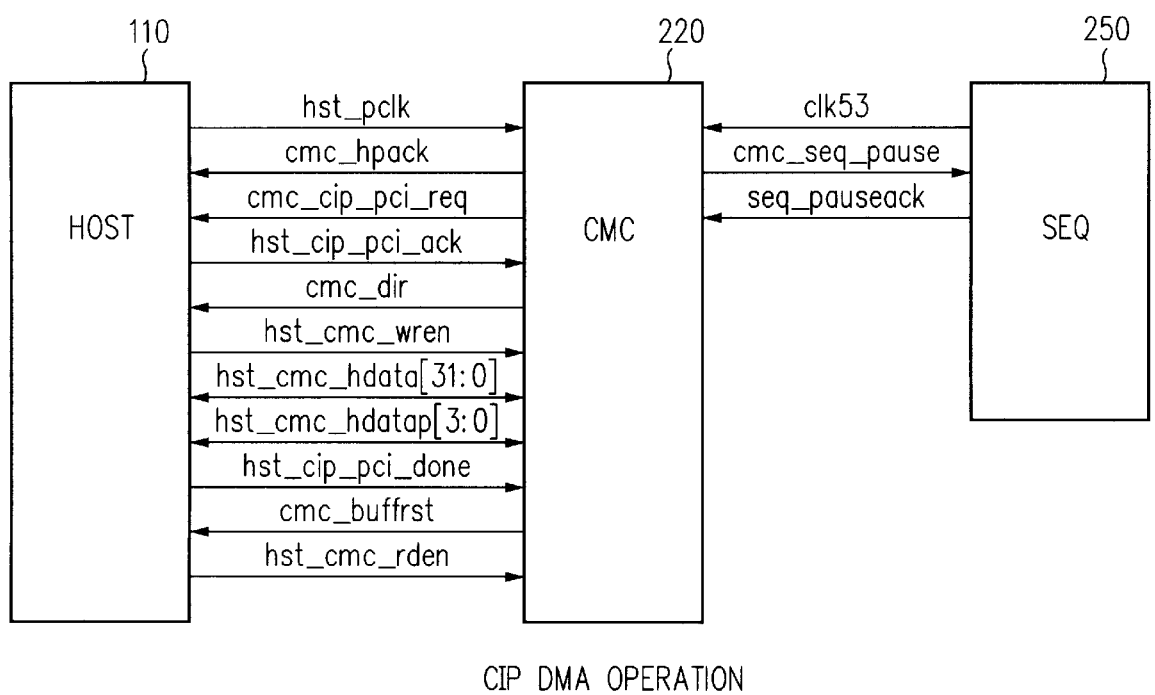
FIG. 9 is a schematic block diagram showing a DMA operation for sending update information to the hardware interface module to reduce PIO activity of the host computer.

Referring to FIG. 9, a schematic block diagram illustrates a DMA. operation for sending four bytes of update information, specifically contents of POST_STAT registers, to the hardware interface module 118 to reduce PIO activity of the host computer 110. The CIP_DMAEN bit 6 of CMC_DMA_CTL register is always set active when the feature is to be used. However, the CMC Interrupt Status DMA operation is initiated only when any one of the bits in POST_STAT registers are asserted high following a previously low state, asserting a cmc_cip_pci_req signal. The DMA operations for sending update information is substantially the same as the DMA operations for a transfer between CMC SRAM 310 and PCI bus interface 210 which is described with reference to FIGS. 6A and 6B. However, the CIP_DMA transfer on the PCI bus is a two-operation DMA transfer including a first DMA write operation to a preset system memory location, followed immediately by a DMA read and compare operation to ensure that the status is posted into system memory 102. Following the four-byte write operation between command management channel 220 and host computer 110, the host interface 210 generates hst_cip_pci_done, then command management channel 220 generates a reset signal and changes the direction bit to a read without deasserting cmc_cip_pci_req. Only after receiving hst_cip_pci_done signal for read operation, command management channel 220 deasserts cmc_cip_pci_req signal, and host interface 210 deasserts hst_cip_pci_ack. The command management channel 220 then performs the compare operation. If a mismatch occurs, the CIP_DMA operation is repeated.

Referring to FIG. 10, a schematic block diagram illustrates a portion of an internal architecture of the host interface 210. The host interface 210 supports PCI bus programmable Latency Timer, Cache Size, and Interrupt Line Select registers. The host interface 210 also supports PCI bus address and data parity generation and checking.

The host interface 210 has a PCI interface 1002 forming a direct pin-out connection to a 64-bit or 32-bit PCI bus 120. The PCI interface 1002 includes a path input module, a path output module, and a miscellaneous module. The path input module includes address and command byte enable input latches, parity checking, and input data steering. The path output module includes address, data, and command byte enable multiplexers for all output signals, and parity generation. The miscellaneous module includes pad control decoding, dual interrupt enable and error control, and error logic.

The host interface 210 includes the bus target interface 216 that connects the CIOBUS 308 and HIOBUS 1004 within the host adapter 140 to the PCI interface 1002. The bus target interface 216 includes a target state machine 1006, a target bus interface module 1008, a target address data interface 1010, a configuration module 1011, and an address comparator 1012. The target state machine 1006 handles PCI target mode and protocol operations including transmit ready, device select, and stop generation. The target state machine 1006 also generates target data phase signals. The target bus interface module 1008 defines a target transfer protocol such is the HIOBUS interface protocol. The target bus interface module 1008 also generates configuration read write strobes to the configuration module 1011, performs address decodes, and performs command decodes. The target address data interface 1010 reflects address and data flow. The configuration module 1011 includes configuration registers, performs specific configuration register decode operations, and performs io, memory, and rom base compare operations. The configuration module 1011 also sets latency timeout durations. The configuration registers are readable from register space of devices in the host adapter 140. Device configuration registers, such as DEVCONFIG, are included in the host interface 210 to configure data for PCI interface 210 including a device base address and an interrupt request IRQ.

The host interface 210 also includes the bus master interface 214 that connects the send payload buffer 286 and the receive payload buffer 276 to the PCI interface 1002. A latch 1014 is connected between the PCI interface 1002 and includes two-level latches, byte alignment multiplexers and a packer for transferring data between the PCI bus 120 and the send payload buffer 286 and the receive payload buffer 276 to the PCI interface 1002. The latch 1014 generates read and write strobes to the send payload buffer 286 and the receive payload buffer 276 and decodes status information including counts, and cache line size availability for starting or terminating PCI master cycles.

A master state machine module 1018 handles PCI master mode and protocol operations including PREQ generation and PCI arbitration. The master state machine module 1018 also generates frame, device selection timeout, and command signals. The master state machine module 1018 controls device selection timeouts, latency timeout activation, dual address cycles, park conditions, and master data and address phase signals.

The bus master interface 214 supports zero wait state 64-bit memory data transfers at 267 Mbytes/sec data bursts including leading and trailing 64-bit boundary offset bytes, with a 64-bit address range.

A slave 1020 includes a ROM data packer module 1022, a memory port interface module 1024, a host io module 1026, and a host CIOBUS io module 1028. The ROM data packer module 1022 routes ROM addresses and control signals to the memory port interface 230. ROM reads pack incoming 8-bit ROM data from the memory port interface 230 into 32-bit groups prior to sending the data to the PCI bus 120. The memory port interface module 1024 handles word writes to the memory port interface 230 via the CIOBUS 308. The host io module 1026 contains host-only accessible registers including a one-byte parity error status register and a one byte parity error enable register. The host io module 1026 translates CIOBUS signals based on HIOBUS activity. The host CIOBUS io module 1028 contains CIOBUS accessible registers including a host to RPB DMA control register, a host to SPB DMA control register, an RPB status register, an SPB status register, a mode select register, and a testmode register.

Host interface 210 interrupt handling addresses PCI errors and Internal Parity Errors. Errors on the PCI bus 120 generate interrupts to the system if enabled. PCI bus errors are reflected in the PCI config space register STATUS1 (04h) including error bits DPE, SSE, RMA, RTA, STA, and DPR. The host adapter 140 handles multiple different DMA operations so that the errors are further classified into specific types and logged accordingly in DMA_ERROR[2:0] registers. The DMA_ERROR[2:0] registers are located in PCI config space (48h, 49h, and 4Ah). Five groups of DMA errors are partitioned based on the DMA operation in which the error occurs including HR DMA, HS_DMA, CP_DMA, CIP_DMA, or CC_DMA. DMA errors are classified only into groups DPE, RMA, RTA and DPR, so that only these classes are further classified into specific DMA operations. In addition, a status bit T_DPE is set in the event of a PCI target DPE error directed to the host adapter 140.

Error notifications are generated as follows: First, respective PERRESPEN and SERREPSEN bits are set active. CMC interrupt status enable bits are also set including CIP_DMAEN=1, INTEN=1, and IPEN[1] bit 7 PCI_ERR_INTEN-=1.

When the PCI errors occur, for instance, DPE error on HR_DMA, the HR_DMA_DPE bit of DMA_ERROR[0] bit 7 is set; the HR_ERROR bit of the HR_STATUS register is also set for the SEQ; as well as the DPE bit of the PCI config register STATUS1 bit 31. The host interface 210 then sets the CMC PCI_EBR_INT bit in POST_STAT[1] register bit 7. Interrupts are enabled so that the POST_STAT is posted and IRQ is issued.

Servicing by the hardware interface module 118 proceeds as follows. The hardware interface module 118 detects that POST_STAT[1] value is set appropriately and evaluates the PCI config STATUS1 register. The DPE bit is set so that the hardware interface module 118 continues to determine which DMA is implied via the DMA_ERROR register. When the interrupt is serviced, the hardware interface module 118 then clears the DPE & HR_DMA_DPE bit by writing (1) to the bits. Clearing the respective DMA_ERROR bit also clears the HR_ERROR bit of the HR_STATUS register. The POST_STAT[1] bit 7 PCI_ERR_INT bit clears the HR_ERROR bit of the HR_STATUS register. The POST_STAT [1] bit 7 PCI_ERR_INT bit is cleared by writing to the CLR_PCI_NT bit of the CLRINT[1] register, thereby clearing the IRQ.

Internal Parity Errors are other internal HST errors including parity errors between data paths of HST/CMC/RPB. The data path from command management channel 220 to host interface 210 may have an internal parity error. In this event, the CMC CRPARERR status bit in ERROR register is set; the HW_ERR_INT bit of POST_STAT[1] register bit 6 is also set. If interrupts are enabled, IRQ is asserted. The hardware interface module 118 detects an internal hardware error and evaluates the ERROR register to determine the source. Servicing is completed after all evaluations and the CRPARERR bit is cleared via the CLR_PARERR bit of the CLRINT1 register bit 6, also clearing the HW_ERR_INT POST_STAT[1] bit 6.

Another source of parity error is the data path from receive payload buffer 276 to host interface 210 which sets the CMC DRHPARERR bit. Clearing of the interrupt is performed similarly.

Registers in the configuration module 1011 include a device configuration register, DEVCONFIG. The Device Configuration register is a read/write register that supports mode selection control of features in the host adapter 140. DEVCONFIG may be read or written at any time in Configuration space. However, changing values in DEVCONFIG is performed with care due to the functional changes controlled. For example, the DEVCONFIG value is reset to 80h only during RST# assertion. Bits 4, 5, and 7 of DEVCONFIG are not used and always read zero.

Bit 6 of DEVCONFIG is MRDCEN, a Memory Read Command Enable bit. An active (1) MRDEN enables the PCI master command-out generator to generate the MRDC command value for defined conditions. MRDEN enables master burst transfers being made with MRDLC or MRDMC commands to release the bus after the current and next data transfers are completed when the LATTIME register has expired and GNT# is not asserted. When inactive, MRDEN causes the PCI master command-out generator to convert all MRDC commands to MRDLC commands. MRDEN enables master burst transfers being made with MRDLC or MRDMC commands, when the LATTIME register has expired and GNT# is not asserted, to release the bus after completing the current cache line.

Bit 3 of DEVCONFIG is BERREN, a Byte Parity Error Enable bit. When BERREN is active (1), the internal byte parity generators create even-parity for the associated data byte. When BERREN is inactive, normal odd-parity is generated. BERREN is used to test logic and the parity checking logic in the data paths (HST-SPB-SFC; RFC-RPB-HST; HST-MPI; HST-CMC-MPI).

Bit 2 of DEVCONFIG is DACEN, a Dual Address Cycle Enable bit. When DACEN is active, the host adapter 140 is enabled to issue Dual Address Cycle (DAC) master transactions of 32-bit range within a 32-bit page of a 64-bit range pointed to by the value stored in the Hx_DMA_HADR [3:0] registers. When Hx_DMA_HADR[3:0] stored value is zero, only Single Address Cycles (SAC) is issued the same as when DACEN is not active.

Bit 1 of DEVCONFIG is CIP_RD_DIS, a CMC Interrupt Posting Read DMA Disabled bit. When CIP_RD_DIS is active (1), the CIP DMA operation is performed as a single 4-byte PCI write to system memory operation with no readback DMA for comparison to verify delivery. When CIP_RD_DIS is inactive (0), a single 4-byte PCI write to system memory is followed by a PCI read to flush out the system bridges and the POST_STAT status is compared to ensure the latest status update.

Bit 0 of DEVCONFIG is EXTM_BISTEN, an External Memory BIST Enable bit. When EXTM_BISTEN is active (1), the BIST logic performs Built-In-Self-Test (BIST) testing to the external SRAM.

Figure 11:
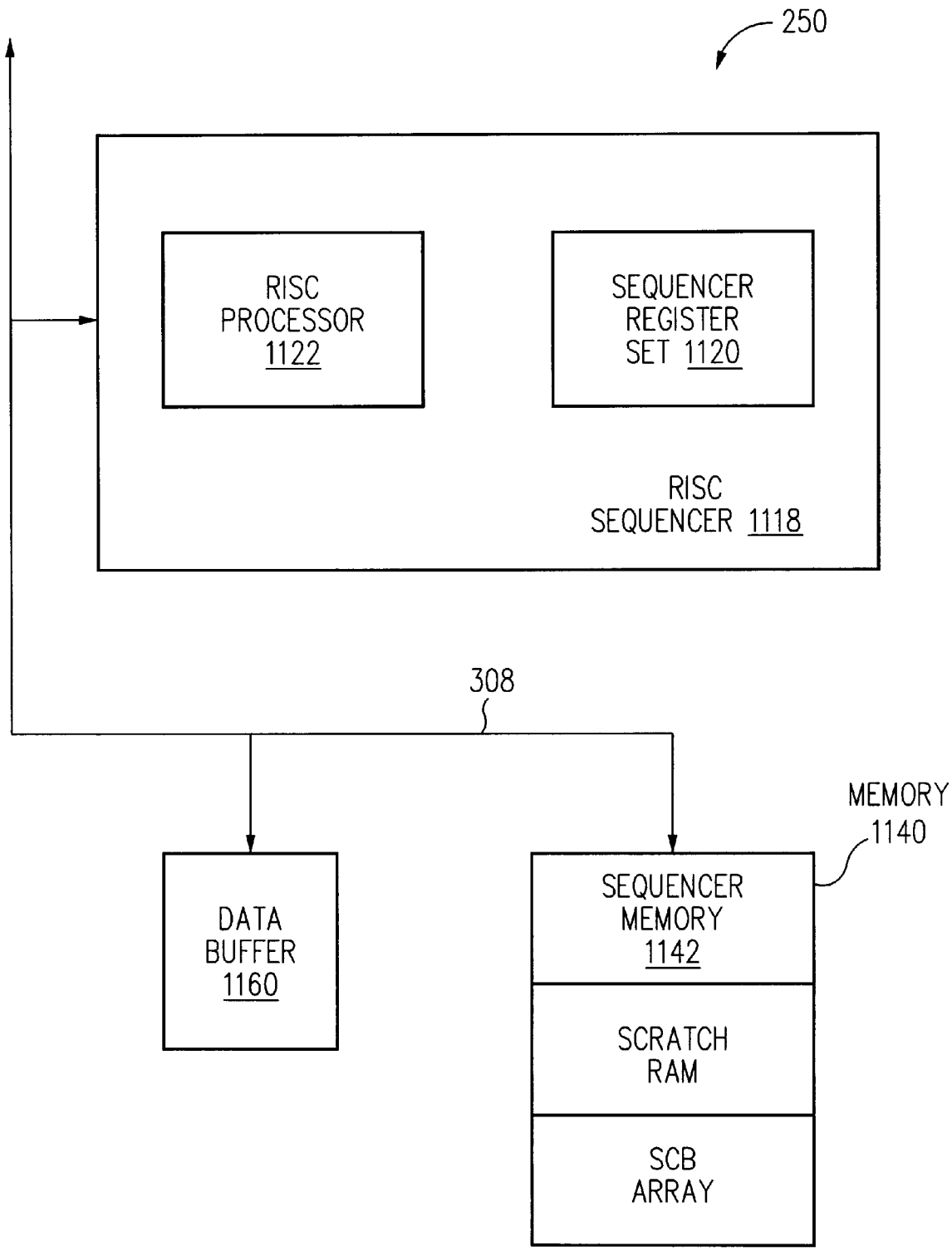
FIG. 11 is a block diagram showing selected circuit blocks of the host adapter, specifically showing blocks that relate to a processor within the host adapter.

Referring to FIG. 11, a schematic block diagram shows the Multi-Tasking Protocol Engine 250, a processor within the host adapter 140 in additional detail. The processor 250 functions as a multitasking processor engine and includes a sequencer random access memory (RAM) that is illustratively shown as a sequencer memory 1142 in memory 1140, a RISC processor 1122, and a sequencer register set 1120. In the illustrative processor 250, the sequencer memory 1142 is an internal SRAM firmware storage with 1024 instruction lines (32-bit words with parity).

The processor 250 includes a RISC sequencer 1118, a data first-in-first-out (FIFO) memory circuit 1160, and a memory 1140. The RISC sequencer 1118, data buffer memory circuit 1160, memory 1140 and the host interface 210 are interconnected by a data transfer bus structure, a CIOBUS 308, to form a high speed path for transfer of data between the computer bus, illustratively PCI bus 120, and the FC link 208. The CIOBUS 308 interconnects the sequencer 1118, data buffer memory circuit 1160, memory 1140, and host interface 210 to control the host adapter integrated circuit 140 both by a host microprocessor (not shown) through a host adapter driver (not shown) and by the sequencer 1118.

The sequencer register set 1120 includes a plurality of registers having various characteristics such as read-only, write-only, or read-write access characteristics. The plurality of registers include bits that are selectively cleared or set upon the occurrence of a reset signal. Registers in the sequencer register set 1120 include a sequencer control register SEQCTL that contains bits for controlling operation of sequencer 250. A sequencer Ram data register SEQRAM is a port to the sequencer memory 1142. The sequencer memory 1142 is loaded by pausing the sequencer 250 and then asserting a bit LOADRAM in the register SEQCTL. A starting address is written into sequencer address register SEQADDR before writing to the SEQRAM register. The word ordering begins with the least significant word of the program in the MTPE sequencer 250 and ends with the most significant word. The address automatically increments after every second word is written to facilitate program loading. While LOADRAM is set, SEQRAM data may be read to verify contents of sequencer memory 342. The MTPE sequencer 250 cannot be unpaused while LOADRAM bit is set. Once LOADRAM is cleared, SEQRAM cannot be read or written.

Sequencer address registers SEQADDR contain the address of the instruction within sequencer memory 1142 that is executed on the next clock edge. The registers are written to change the execution location after pausing the sequencer 250 or are written during execution by the sequencer 250. SEQADDR may be written when the sequencer 250 is not paused, thereby performing an indirect jump instruction. The SEQADDR registers are also used to specify the starting location when loading sequencer firmware in a host adapter initialization process. The starting location address is automatically incremented while loading the sequencer firmware after every second word. The second word index is set when the first word is written and is cleared when the second word is written. Clearing the LOADRAM bit clears the second word index, if set. SEQADDR powers up to a default value of zero.

Accumulator register ACCUM is a temporary holding cell for arithmetic or logical operations. ACCUM is the second source to the ALU when the value of the 'immediate' field in the microcode word, which is described more completely below, is zero. An exception to this is for ORI operations where operand2 is always the value contained in the immediate field. All bits of this register power up to a value of zero.

A source index register SINDEX is a temporary holding register or is used as an indirect address for source operands for some ALU operations, but is not available for usage to indirectly address a source operand. All SINDEX register bits power up to a value of zero.

Destination index register DINDEX is a temporary holding register or is used as an indirect address for destination operands for some ALU operations, but is not available for usage to indirectly address the destination. All DINDEX bits power up to a value of zero.

Break address register BRKADDR0/1 is used for diagnostic purposes to halt sequencer 250 at a specified address. BRKADDR0 is loaded with the lower eight bits of a break address. All BRKADDR0/1 bits power up to a value of zero. BRKADDR1 is loaded with the upper two bits of the break address and bit 7 operates as a break condition disable. To break at an instruction located at address 'X' in the sequencer memory 342, the value of the break address should be X such that the instruction at address X is the logical outcome of the instruction located at X. The SEQADDR after the break condition will be X+1 for in-line code or Y+1 for the next address as a result of a jump or CALL action.

ALLONES register contains the hexadecimal value FFFFh to supply the value of FFFFh to an operand in an ALU (not shown), or other memory location or register. ALLZEROS register contains the hexadecimal value 0000h to supply the value of 0000h to an operand in the ALU, other register, or other memory location. NONE register is written to a destination when no change is to be made to the destination. Carry and zero flags register FLAGS stores the carry flag and the zero flag.

SINDIR register is an indirect address for a source register that is used for indirectly addressing the source data. A transfer from SINDIR register utilizes the contents of register SINDEX as the source address. The contents of register SINDEX are auto-incremented the clock cycle after SINDIR register is addressed except when addressing a single point address location.

DINDIR register is an indirect address destination register for indirectly addressing the destination write register DINDEX. When a transfer is made to the destination, the contents of register DINDEX identify the destination address. The contents of register DINDEX are auto-incremented the clock cycle after DINDIR has been addressed except when addressing a single point address location.

FUNCTION1 register is used for the sequencer 250 to perform a special function that reduces the number of instructions executed. Data is written to registers FUNCTION1 with valid data in bits 6 to 4 that is decoded into one of eight bit positions. For example, a value of zero sets a value "1" in bit position zero A value of one gives a value "1" in bit position one, and the like, with all other bit positions having a value of zero.

STACK is a sequencer stack register that supplies a circular stack function containing eight two-byte entry locations for the sequencer 250. Contents of the stack are reported one word at a time starting from the last location pushed on the stack until all entries are reported. The stack entries are reported on consecutive reads. Location zero points to the last pushed entry. The stack pointer increments after each word read. Therefore, eight reads are made to restore the location of the point to the original value when desired.

Registers in the multi-tasking protocol engine 250 include a STACK register, a sequencer RAM address (SEQADDR) register, and a sequencer control (SEQCTL) register. The STACK register is a data port that supports word access only. STACK register performs a circular stack function containing eight levels, each ten bits wide (the address range of the sequencer RAM 342). Contents of the STACK register are readable and writeable by the multi-tasking protocol engine 250 or the host computer 110. The STACK normally contains the sequencer RAM address value (SEQADDR), but is optionally used as a temporary holding register.

The CIOBUS 308 includes (i) a source bus with separate address and data buses, (ii) a destination bus with separate address and data buses, and (iii) a plurality of control signal lines. CIOBUS 308 supports high speed normal operations that are controlled by sequencer 1118 as well as slower but extended operations during error recovery that are controlled by the host adapter driver using the host microprocessor.

The structure of CIOBUS 308 is selected to increase the speed of host adapter 140 and to reduce command overhead. Command overhead is defined as the time utilized for the host adapter 140 to process a FC command. The CIOBUS 308 transfers data from one part of the host adapter 140 to another in less than 40nanoseconds (ns), allowing 26.6 Mega-instructions per second (MIPS) operation. CIOBUS 308 transfers data at more than an order of magnitude faster than current conventional embedded microprocessor host adapter designs. Splitting of CIOBUS 308 into source buses and destination buses allows each sequencer instruction to be completed in a single sequencer clock cycle. In contrast, multiple cycles are used on a shared bus. Furthermore, in some cases a write operation and a read operation are performed simultaneously over CIOBUS 308.

Host interface module 118 performs functional control operations controlling the host adapter 140 either as a bus slave or a bus master that transfers data and commands between host computer bus 120 and CIOBUS 308. In one exemplary system, all data transfers between host interface module 118 and host computer bus 120 are direct memory access (DMA) transfers. The term "DMA transfer" refers an information transfer in which the starting address for the information and the length of the information are supplied to a DMA hardware circuit and the DMA hardware circuit handles the data transfer.

Sequencer 1118 handles all normal phase sequences of signals on the FC link 208 without intervention from the host adapter driver. Sequencer 1118 also controls DMA and PIO data transfers. Sequencer 1118 not only manages the basic protocol on the FC link 208, but also handles more advanced features usually handled by a host microprocessor.

Sequencer 1118 includes the RISC processor 1122 that operates with a single clock and completes each sequencer instruction in one sequencer clock cycle. In contrast conventional RISC processors require multiple overlapping clocks to achieve one instruction per clock cycle operation. All memory addressed by sequencer 1118 and all the sequencer firmware are contained within host adapter 140.

Data buffer memory circuit 1160 is disclosed in co-filed U.S. patent application Ser. No. 09/089,311, titled "A Host Adapter Having Paged Buffers for Simultaneously Transferring Data between a Computer Bus and a Peripheral Bus", which is hereby incorporated by reference herein in its entirety. Data buffer memory circuit 1160 is included in host adapter 140 to improve data transfer efficiency. A data threshold for data FIFO memory circuit 1160 is programmable based on the relative data transfer speeds of computer bus 120 and FC link 208. At a data rate that exceeds the data threshold, data FIFO memory circuit 1160 supplies an enable signal to host interface module 118. The host interface module 118 responds by asserting a signal on host computer bus 120 that requests control of bus 120 as a bus master. Host adapter 140 takes control of host computer bus 120 only when host adapter 140 is ready to transfer or receive data from bus 120. The host adapter 140 is thereby configured to effectively utilize both FC link 208 and computer bus 120 to reduce degradation of system performance commonly associated with the inefficient utilization of buses by prior art host adapters.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, the use of a microprocessor is illustrative only of a general processing unit in a computer system and is not intended to limit the invention. Furthermore, through- out the claims the term "a" is used to introduce an element but does not in any instance refer to a single or "one" element but instead refers to "one or more than one" element.

What is claimed is:

1. A bus interface apparatus comprising:
   a host interface that is connectable to a bus, the bus being connectable to a host system, the host system including a host driver; and
   a command channel control and monitoring circuit coupled to the host interface and including a data buffer, the command channel control and monitoring circuit controlling and monitoring communication functionality between the data buffer and the bus;
   the command channel control and monitoring circuit including an interrupt posting status register that is readable by the host driver, the interrupt posting status register consolidating a summary of interrupt status information of interrupts arising from a plurality of functional blocks coupled to the bus, the interrupt posting status register being readable by the host driver to investigate a cause of the interrupt statue;.

2. A bus interface apparatus according to claim 1 wherein:
   the command channel control and monitoring circuit is a DMA circuit supporting DMA access of the interrupt posting status register via the bus.

3. A bus interface apparatus according to claim 1 wherein the bus is a Peripheral Component Interface (PCI) bus.

4. A bus interface apparatus according to claim 1 further comprising:
   the host system including a system memory with a mirror storage of the interrupt posting status register that receives data transmitted from the interrupt posting status register by a direct memory access (DMA) operation, values in the mirror storage of the interrupt posting status register being updated automatically when a change occurs in a value within the interrupt posting status register in the command channel control and monitoring circuit.

5. A bus interface apparatus according to claim 4 wherein:
   the host system host driver includes a routine for accessing the interrupt posting status register via a bus access operation, changing a bit in a register of the interrupt posting status register, and monitoring the result of the access and bit change in the mirror of the register in the system memory without and additional bus read access.

6. A bus interface apparatus according to claim 4 wherein:
   an interrupt value is preposted in the mirror storage of the interrupt posting status register before a bus interrupt signal is activated when an automatic interrupt posting status update functionality is enabled; and
   the bus interrupt signal is activated without delay when the automatic interrupt posting status update functionality is not enabled.

7. A bus interface apparatus according to claim 1 wherein:
   the command channel control and monitoring circuit functionality includes transmission of data from the data buffer over the bus using a direct memory access (DMA) operation including a read and compare option so that interrupt status information is posted into a storage in the system memory that mirrors the interrupt posting status register and checks for any update during the direct memory access operation.

8. A bus interface apparatus according to claim 1 wherein:
   the command channel control and monitoring circuit handles dual interrupt requests including one interrupt request for normal interrupts and a second interrupt request for abnormal interrupts.

9. A bus interface apparatus according to claim 8 wherein:

the interrupt request for normal interrupts and the interrupt request for abnormal interrupts are programmable and are selectively merged into one interrupt.

10. A bus interface apparatus according to claim 1 wherein:

a plurality of command completions are queued on a single interrupt.

11. A bus interface apparatus according to claim 1 further comprising:

an interrupt posting enable register having a plurality of status bits, the interrupt posting enable register being coupled to the command channel control and monitoring circuit and individually controlling issue of interrupts for each status bit.

12. A bus interface apparatus according to claim 1 further comprising:

a device configuration register having a plurality of bits, the device configuration register being coupled to the command channel control and monitoring circuit and individually enabling and disabling a read and compare operation of posted interrupt status that controls automatic and immediate reading and comparing a selected storage location following a write of the selected storage location.

13. A bus interface apparatus comprising:

a bus;

a host system coupled to the bus, the host system including a system memory;

a host interface that is connectable to the bus for communicative interfacing to the host system; and a command channel control and monitoring circuit coupled to the host interface and including a data buffer, the command channel control and monitoring circuit controlling and monitoring communication functionality between the data buffer and the bus;

the command channel control and monitoring circuit including an interrupt posting status register consolidating a summary of interrupt status information of interrupts arising from a plurality of functional blocks coupled to the bus, the system memory including a mirror storage of the interrupt posting status register that receives data transmitted from the interrupt posting status register by a direct memory access (DMA) operation, values in the mirror storage of the interrupt posting status register being updated automatically when a change occurs in a value within the interrupt posting status register in the command channel control and monitoring circuit.

14. A bus interface apparatus according to claim 13 wherein the bus is a Peripheral Component Interface (PCI) bus.

15. A bus interface apparatus according to claim 13 wherein:

the host system includes a host driver, the host driver including a routine for accessing the interrupt posting status register via a bus access operation, changing a bit in a register of the interrupt posting status register, and monitoring the result of the access and bit change in the mirror of the register in the system memory without an additional bus read access.

16. A bus interface apparatus according to claim 13 wherein:

an interrupt value is preposted in the mirror storage of the interrupt posting status register before a bus interrupt signal is activated when an automatic interrupt posting status update functionality is enabled; and the bus interrupt signal is activated without delay when the automatic interrupt posting status update functionality is not enabled.

17. A bus interface apparatus according to claim 13 wherein:

the command channel control and monitoring circuit functionality includes transmission of data from the data buffer over the bus using a direct memory access (DMA) operation including a read and compare option so that interrupt status information is posted into a storage in the system memory that mirrors the interrupt posting status register and checks for any update during the direct memory access operation.

18. A bus interface apparatus according to claim 13 wherein:

the command channel control and monitoring circuit handles dual interrupt requests including one interrupt request for normal interrupts and a second interrupt request for abnormal interrupts.

19. A bus interface apparatus according to claim 18 wherein:

the interrupt request for normal interrupts and the interrupt request for abnormal interrupts are programmable and are selectively merged into one interrupt.

20. A bus interface apparatus according to claim 13 wherein:

a plurality of command completions are queued on a single interrupt.

21. A bus interface apparatus according to claim 13 further comprising:

an interrupt posting enable register having a plurality of status bits, the interrupt posting enable register being coupled to the command channel control and monitoring circuit and individually controlling issue of interrupts for each status bit.

22. A bus interface apparatus according to claim 13 further comprising:

a device configuration register having a plurality of bits, the device configuration register being coupled to the command channel control and monitoring circuit and individually enabling and disabling a read and compare operation of posted interrupt status that controls automatic and immediate reading and comparing a selected storage location following a write of the selected storage location.

23. A bus interface apparatus comprising:

a host interface that is connectable to a bus, the bus being connectable to a host system, the host system including a host driver and a system memory; and a command channel control and monitoring circuit coupled to the host interface and including a data buffer, the command channel control and monitoring circuit including an interrupt posting status register that is readable by the host driver, the command channel control and monitoring circuit capable of controlling and monitoring communication functionality between the data buffer and the bus, the communication functionality including transmission of data from the data buffer over the bus using a direct memory access (DMA) operation including a read and compare option so that interrupt status information is posted into a storage in the system memory that mirrors the interrupt posting status register and checks for any update during the direct memory access operation.

24. A bus interface apparatus according to claim 23 wherein the bus is a Peripheral Component Interface (PCI) bus.

25. A bus interface apparatus according to claim 23 further comprising:
the host system wherein:
the system memory includes a mirror storage of the interrupt posting status register that receives data transmitted from the interrupt posting status register by a direct memory access (DMA) operation, values in the mirror storage of the interrupt posting status register being updated automatically when a change occurs in a value within the interrupt posting status register in the command channel control and monitoring circuit.

26. A bus interface apparatus according to claim 25 wherein:
the host system host driver includes a routine for accessing the interrupt posting status register via a bus access operation, changing a bit in a register of the interrupt posting status register, and monitoring the result of the access and bit change in the mirror of the register in the system memory without an additional bus read access.

27. A bus interface apparatus according to claim 25 wherein:
an interrupt value is preposted in the mirror storage of the interrupt posting status register before a bus interrupt signal is activated when an automatic interrupt posting status update functionality is enabled; and
the bus interrupt signal is activated without delay when the automatic interrupt posting status update functionality is not enabled.

28. A bus interface apparatus according to claim 23 wherein:
the command channel control and monitoring circuit functionality includes transmission of data from the data buffer over the bus using a direct memory access (DMA) operation including a read and compare option so that interrupt status information is posted into a storage in the system memory that mirrors the interrupt posting status register and checks for any update during the direct memory access operation.

29. A bus interface apparatus according to claim 23 wherein:
the command channel control and monitoring circuit handles dual interrupt requests including one interrupt request for normal interrupts arid a second interrupt request for abnormal interrupts.

30. A bus interface apparatus according to claim 29 wherein:
the interrupt request for normal interrupts and the interrupt request for abnormal interrupts are programmable and are selectively merged into one interrupt.

31. A bus interface apparatus according to claim 23 wherein:
a plurality of command completions are queued on a single interrupt.

32. A bus interface apparatus according to claim 23 further comprising:
an interrupt posting enable register having a plurality of status bits, the interrupt posting enable register being coupled to the command channel control and monitoring circuit and individually controlling issue of interrupts for each status bit.

33. A bus interface apparatus according to claim 23 further comprising:
a device configuration register having a plurality of bits, the device configuration register being coupled to the command channel control and monitoring circuit and individually enabling and disabling a read and compare operation of posted interrupt status that controls automatic and immediate reading and comparing a selected storage location following a write of the selected storage location.

34. A bus interface apparatus comprising:
a bus;
a host system;
means connectable to the bus for interfacing [a] the host system to the bus, the host system including:
a host driver;
means for storing a mirror image of the summary of interrupt status information that is posted by the posting means; and
means for automatically updating the mirror image when a change occurs in the summary of interrupt status information;
a data buffer;
means coupled to the interfacing means and coupled to the data buffer for controlling and monitoring communication functionality between the data buffer and the bus, the controlling and monitoring means further including:
means for consolidating a summary of interrupt status information of interrupts arising from a plurality of functional blocks coupled to the bus; and
means for posting the summary of interrupt status information, the posting means being readable by the host driver.

35. A bus interface apparatus according to claim 34 wherein:
the host system further includes:
means for accessing the summary of interrupt status information via a bus access operation;
means for changing the summary of interrupt status information; and means for monitoring the result of the change in the summary of interrupt status information and in the mirror image without an additional bus read access.

36. A bus interface apparatus according to claim 34 further comprising:
means for preposting an interrupt value in the mirror image before a bus interrupt signal is activated when an automatic interrupt posting status update functionality is enabled; and
means for activating the bus interrupt signal without delay when the automatic interrupt posting status update functionality is not enabled.

37. A bus interface apparatus according to claim 34 further comprising:
means for transmitting data from the data buffer over the bus using a direct memory access (DMA) operation including a read and compare option so that interrupt status information is posted into a storage in the system memory that mirrors the interrupt posting status register and checks for any update during the direct memory access operation.

38. A bus interface apparatus according to claim 34 further comprising:
means for handling dual interrupt requests including one interrupt request for normal interrupts and a second interrupt request for abnormal interrupts.

39. A bus interface apparatus according to claim 38 further comprising:

means for programming interrupt requests for normal interrupts and for abnormal interrupts; and means for merging the normal interrupt requests and abnormal interrupt requests into a single interrupt.

40. A bus interface apparatus according to claim 38 further comprising:

means for queuing a plurality of command completions on a single interrupt.

41. A bus interface apparatus according to claim 34 further comprising:

means for individually controlling issue of a plurality of interrupts.

42. A method of operating a bus interface for interfacing a host system to a bus, the bus interface including a data buffer, the host system including a host driver, the method comprising:

interfacing the host system to the bus;

controlling and monitoring communication functionality between the data buffer and the bus including:

consolidating a summary of interrupt status information of interrupts arising from a plurality of functional blocks coupled to the bus;

posting the summary of interrupt status information in a storage that is readable by the host driver;

storing a mirror image of the summary of interrupt status information; and automatically updating the mirror image when a change occurs in the summary of interrupt status information.

43. A method according to claim 42 further comprising:

accessing the summary of interrupt status information via a bus access operation; changing the summary of interrupt status information; and monitoring the result of the change in the summary of interrupt status information and in the mirror image without an additional bus read access.

44. A method according to claim 42 further comprising:

preposting an interrupt value in the mirror image before a bus interrupt signal is activated when an automatic interrupt posting status update functionality is enabled; and activating the bus interrupt signal without delay when the automatic interrupt posting status update functionality is not enabled.

45. A method according to claim 42 further comprising:

transmitting data from the data buffer over the bus using a direct memory access (DMA) operation including a read and compare option so that interrupt status information is posted into a storage in the system memory that mirrors the interrupt posting status register and checks for any update during the direct memory access operation.

46. A method according to claim 42 further comprising:

handling dual interrupt requests including one interrupt request for normal interrupts and a second interrupt request for abnormal interrupts.

47. A method according to claim 46 further comprising:

programming interrupt requests for normal interrupts and for abnormal interrupts; and merging the normal interrupt requests and abnormal interrupt requests into a single interrupt.

48. A method according to claim 46 further comprising:

queuing a plurality of command completions on a single interrupt.

49. A method according to claim 42 further comprising:

individually controlling issue of a plurality of interrupts.

* * * * *

UNITED STATES PATENT AND TRADEMARK OFFICE
CERTIFICATE OF CORRECTION

PATENT NO.     : 6,085,278
DATED          : July 4, 2000
INVENTOR(S)    : Stillman F. Gates and Jamileh Davoudi It is certified that error appears in the above-identified patent and that said Letters Patent is hereby corrected as shown below:

Column 3,
Line 34, after "FIG. 11" please insert -- (FIGURE 3-4) --;

Column 9,
Line 58, "Several" begins a new paragraph;

Column 15,
Line 3, please delete "beci)mes" and insert -- becomes --;

Column 18,
Line 63, before "PCI" please delete ".";

Column 25,
Line 10, after "DMA" please delete ".";

Column 27,
Lines 48-49, the sentence beginning "Another source" is not a new paragraph;

Column 32,
Line 46, after "without" please delete "and" and insert -- an --.

Signed and Sealed this

Twenty-fifth Day of February, 2003

JAMES E. ROGAN
*Director of the United States Patent and Trademark Office*